United States Patent
La Fever et al.

(10) Patent No.: US 9,165,133 B2
(45) Date of Patent: Oct. 20, 2015

(54) SYSTEMS AND METHODS OF DEVICE AUTHENTICATION INCLUDING FEATURES OF CIRCUIT TESTING AND VERIFICATION IN CONNECTION WITH KNOWN BOARD INFORMATION

(71) Applicant: ELECTRONIC WARFARE ASSOCIATES, INC., Herndon, VA (US)

(72) Inventors: George Bernard La Fever, Huntsville, AL (US); Iser B. Flaum, Fullerton, CA (US)

(73) Assignee: Electronic Warfare Associates, Inc., Herndon, VA (US)

( * ) Notice: Subject to any disclaimer, the term of this patent is extended or adjusted under 35 U.S.C. 154(b) by 113 days.

(21) Appl. No.: 13/661,596

(22) Filed: Oct. 26, 2012

(65) Prior Publication Data

US 2013/0125204 A1 May 16, 2013

Related U.S. Application Data

(60) Provisional application No. 61/552,074, filed on Oct. 27, 2011.

(51) Int. Cl.
*G06F 21/00* (2013.01)
*G06F 21/44* (2013.01)
*G06F 21/73* (2013.01)
*G06F 21/76* (2013.01)

(52) U.S. Cl.
CPC ............... *G06F 21/44* (2013.01); *G06F 21/73* (2013.01); *G06F 21/76* (2013.01); *G06F 2221/2103* (2013.01); *G06F 2221/2145* (2013.01)

(58) Field of Classification Search
CPC ................................. G06F 21/44; G06F 21/76
USPC ......... 726/2; 713/182, 194; 714/727; 382/145
See application file for complete search history.

(56) References Cited

U.S. PATENT DOCUMENTS 5,070,448 A 12/1991 Crandall
5,325,368 A 6/1994 James
(Continued)

FOREIGN PATENT DOCUMENTS

EP 0 819 052 8/2001

OTHER PUBLICATIONS

Supplementary European Search Report issued in EP 09838570.1 on Mar. 15, 2013.
(Continued)

*Primary Examiner* — Harunur Rashid
*Assistant Examiner* — Angela Holmes
(74) *Attorney, Agent, or Firm* — DLA Piper LLP (US)

(57) ABSTRACT

A method and system for authenticating a device, board, assembly or system includes obtaining or processing test/scan information provided via extraction of ECID or other unique identifying information regarding a board.

A re-authentication process is performed to verify that the board contains only legitimate ECID or other uniquely identified devices, via comparison of re-extracted codes of devices at known positions against a reference record, the reference record being established by an initial authentication process that utilizes information regarding authentic/unique ECID or other uniquely identified codes of devices delivered to populate the board to derive the reference record for the device.

3 Claims, 11 Drawing Sheets

(56) References Cited

U.S. PATENT DOCUMENTS

| | | | |
|---|---|---|---|
| 5,488,688 A | 1/1996 | Gonzales | |
| 5,535,331 A | 7/1996 | Swoboda et al. | |
| 5,621,651 A | 4/1997 | Swooba | |
| 5,706,297 A | 1/1998 | Jeppesen | |
| 6,032,268 A | 2/2000 | Swoboda et al. | |
| 6,393,591 B1 | 5/2002 | Jenkins, IV et al. | |
| 6,546,505 B1 | 4/2003 | Swoboda et al. | |
| 6,578,167 B2 | 6/2003 | Boorom et al. | |
| 6,721,687 B2 | 4/2004 | Bartolome et al. | |
| 6,766,305 B1 | 7/2004 | Fucarile | |
| 6,842,865 B2 | 1/2005 | Nee | |
| 7,017,081 B2 | 3/2006 | Gomez | |
| 7,089,467 B2 | 8/2006 | Burch | |
| 7,095,718 B1 | 8/2006 | Terry | |
| 7,203,842 B2 | 4/2007 | Kean | |
| 7,215,580 B2 | 5/2007 | Gorobets | |
| 7,237,161 B2 | 6/2007 | Volz | |
| 7,249,172 B2 | 7/2007 | Ollive et al. | |
| 7,287,190 B2 | 10/2007 | Rosenman et al. | |
| 7,366,806 B2 | 4/2008 | Milenkovic et al. | |
| 7,366,955 B2 | 4/2008 | Kuturianu et al. | |
| 7,376,917 B1 | 5/2008 | Lazarut et al. | |
| 7,429,915 B2 | 9/2008 | Cruzado | |
| 7,463,652 B2 | 12/2008 | Karol | |
| 7,526,679 B2 | 4/2009 | So | |
| 7,539,900 B1 | 5/2009 | Plofsky | |
| 7,543,275 B2 | 6/2009 | Kuturianu et al. | |
| 7,558,966 B2 | 7/2009 | Durham | |
| 7,739,517 B2 | 6/2010 | Sahita | |
| 7,801,050 B2 | 9/2010 | Mitra | |
| 7,817,484 B2 | 10/2010 | Demone | |
| 7,853,792 B2 | 12/2010 | Cowburn | |
| 7,937,588 B2 | 5/2011 | Picard et al. | |
| 8,028,924 B2 | 10/2011 | Anderson et al. | |
| 2002/0138801 A1 | 9/2002 | Wang | |
| 2003/0041286 A1 | 2/2003 | Beerom | |
| 2003/0061488 A1 | 3/2003 | Huebler | |
| 2003/0101042 A1 | 5/2003 | Ollive | |
| 2003/0140291 A1 | 7/2003 | Brown et al. | |
| 2003/0196144 A1 | 10/2003 | Swoboda et al. | |
| 2003/0217306 A1 | 11/2003 | Harthcock | |
| 2004/0035919 A1 | 2/2004 | Horng | |
| 2004/0064764 A1 | 4/2004 | Gomez | |
| 2004/0158784 A1 | 8/2004 | Abuhamdeh | |
| 2004/0250150 A1 | 12/2004 | Swoboda | |
| 2005/0216895 A1 | 9/2005 | Tran | |
| 2005/0249105 A1 | 11/2005 | Kahlman et al. | |
| 2005/0262465 A1 | 11/2005 | Goyal | |
| 2006/0026316 A1 | 2/2006 | Milenkovic et al. | |
| 2006/0059387 A1 | 3/2006 | Swoboda | |
| 2006/0136751 A1 | 6/2006 | Bonaccio | |
| 2006/0200718 A1 | 9/2006 | Halliday | |
| 2006/0242499 A1 | 10/2006 | Volz | |
| 2007/0001528 A1 | 1/2007 | Umegaki et al. | |
| 2007/0052809 A1 | 3/2007 | Hammadou | |
| 2007/0192850 A1 | 8/2007 | Cowburn | |
| 2007/0291906 A1 | 12/2007 | Halliday et al. | |
| 2008/0002243 A1 | 1/2008 | Cowburn | |
| 2008/0034334 A1 | 2/2008 | Laouamri | |
| 2008/0098380 A1 | 4/2008 | Klusmeyer | |
| 2008/0137543 A1 | 6/2008 | Mitra | |
| 2008/0260199 A1 | 10/2008 | Cowburn | |
| 2008/0301767 A1 | 12/2008 | Picard et al. | |
| 2009/0177830 A1 | 7/2009 | Orion | |
| 2009/0210763 A1 | 8/2009 | Eckelman | |
| 2009/0307546 A1 | 12/2009 | Dunn | |
| 2010/0174955 A1 | 7/2010 | Carnevale | |
| 2010/0180169 A1 | 7/2010 | La Fever | |
| 2010/0281318 A1 | 11/2010 | Redondo | |
| 2011/0062240 A1 | 3/2011 | Anderson et al. | |
| 2011/0063093 A1 | 3/2011 | Fung et al. | |
| 2011/0108618 A1 | 5/2011 | Cowburn | |
| 2011/0109428 A1 | 5/2011 | Cowburn | |
| 2011/0109429 A1 | 5/2011 | Cowburn | |
| 2011/0109430 A1 | 5/2011 | Cowburn | |
| 2012/0170069 A1 | 7/2012 | Cowburn | |
| 2013/0091587 A1 | 4/2013 | La Fever et al. | |

OTHER PUBLICATIONS

Canadian Office Action issued in CN 2,853,717 mailed Jul. 25, 2014.
Extended Search Report issued in EP12843670.6 mailed Jul. 29, 2014.
U.S. Appl. No. 13/454,165.
U.S. Appl. No. 13/605,888.
International Search Report issued in PCT/US2009/068666 on Aug. 17, 2010.
Written Opinion issued in PCT/US2009/068666 on Aug. 17, 2010.
International Search Report issued in PCT/US2012/034735.
Written Opinion issued in PCT/US2012/034735.
U.S. Appl. No. 12/641,627.
Written Opinion of the International Searching Authority issued in PCT/US2012/062121 mailed on Mar. 20, 2013.
International Search Report issued in PCT/US2012/062121 mailed on Mar. 20, 2013.
International Preliminary Examination Report on Patentability issued in PCT/US2012/062121 mailed on Feb. 7, 2014.
Extended Search Report issued in EP12782825.9 mailed Sep. 24, 2014.
Lyle Pittroff, "JTAG: Tutorial: The Role of JTAG in system debug & test throughout the embedded system development lifecycle", http://boundaryscan.blogspot.com/2010/04/tutorial-role-of-jtag-in-system-debug.html, Retrieved Sep. 15, 2015.
"Joint Test Action Group", Wikipedia, http://en.wikipedia.org/wiki/Joint_Test_Action_Group, Retrieved Sep. 9, 2014.
Altera, "An FPGA Design Security Solution Using a Secure Memory Device" Oct. 2007, ver. 1.0, http://www.altera.com/en_US/pdfs/literature/wp/wp-01033.pdf.
Linke. Bernhar. "Application Note 5779: Introduction to HAS_256 Master/Slave Authentication", Jan. 22, 2014, http://www.maximintegrated.com/en/app-notes/index.mvp/id/5779.
"Parametric Search" http://para.maximintegrated.com/en/search.mvp?fam=secure-authenticator. 2 pages (printed May 20, 2015).
Linke. Bernhar. "Application Note 4594: Protect your FPGA Against Piracy: Cost-Effective Authentication Scheme Protects IP in SRAM-Based FPGA Designs", Aug. 24, 2009, http://www.maximintegrated.com/en/app-notes/index.mvp/id/4594.
Jones, Scott. "Application Note 3675: Protect Your R&D Investment with Secure Authentication", Oct. 19, 2012, http://www.maximintegrated.com/en/app-notes/index.mvp/id/3675.
Xilinx, "FPGA IFF Copy Protection Using Dallas Semiconductor/Maxim DS2432 Secure EEPROMs,", XAPP780 (v1.1),May 28, 2010, http://www.xilinx.com/support/documentationapplication_notes/xapp780.pdf.
U.S. Appl. No. 12/715,184, Unpublished.
Canadian Office Action issued in CA 2,853,717 dated Feb. 2, 2015.
Notice of Allowance issued in Canadian Application No. 2,853,717 dated Jul. 23, 2015 with English Language Translation.

SYSTEMS AND METHODS OF DEVICE AUTHENTICATION INCLUDING FEATURES OF CIRCUIT TESTING AND VERIFICATION IN CONNECTION WITH KNOWN BOARD INFORMATION

CROSS-REFERENCE TO RELATED APPLICATIONS

This application is based on and derives the benefit of the filing date of U.S. Provisional Patent Application No. 61/552,074, filed Oct. 27, 2011. The entire content of this application is herein incorporated by reference in its entirety.

FIELD

The present disclosure is directed to the field of device authentication and, more particularly, towards systems and methods for authenticating devices including features of testing circuitry and/or comparing test results against known device information.

DETAILED DESCRIPTION OF ILLUSTRATIVE EMBODIMENTS

Figure 1:
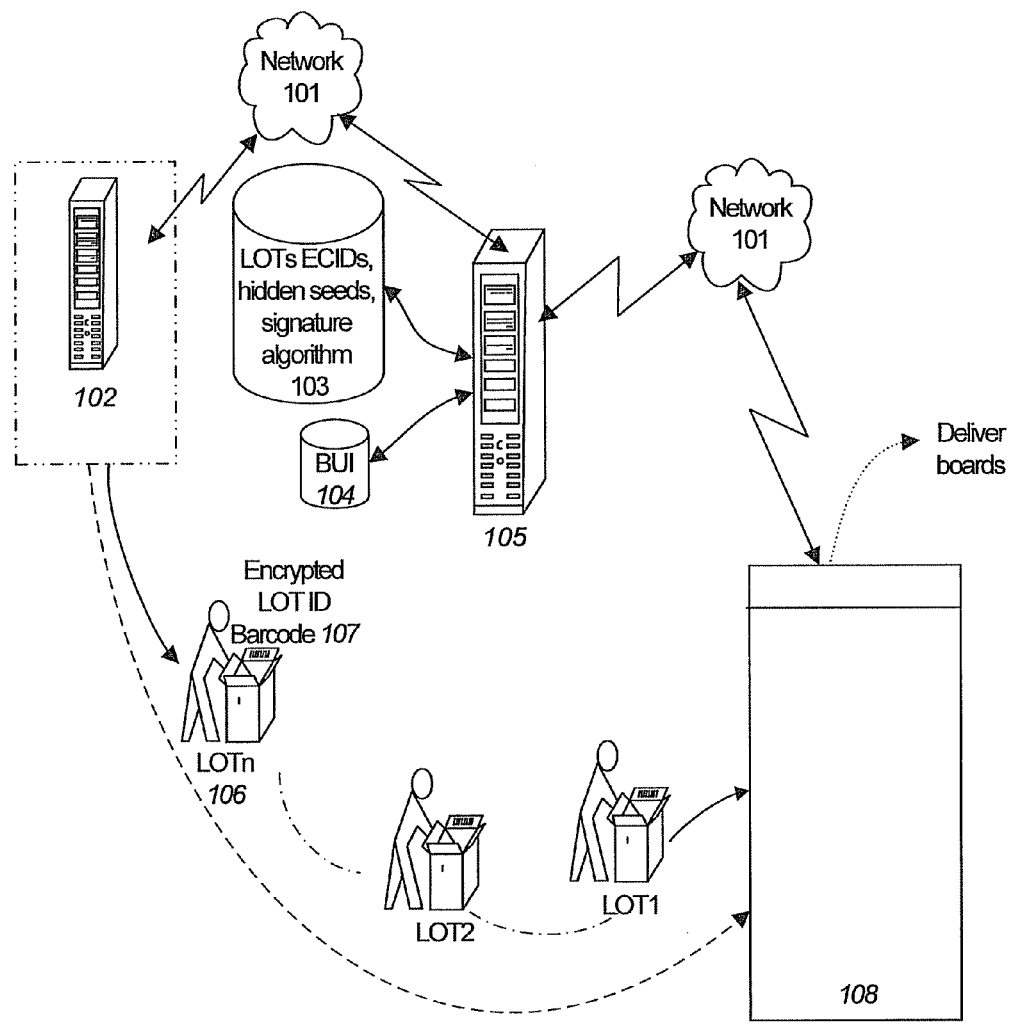
FIG. 1 is a diagram of an illustrative initial authentication system and method as well as associated information processing according to a disclosed implementation.

Presented below are two major approaches to enabling automatic authentication of electronic devices to defend against installment of counterfeit IC's in electronic products. A first approach, requiring some additional internal IC device resources but with some limited vulnerability is based on device inclusion of a readable fixed unique electronic chip identification code, is referred to herein as the ECID method. A second approach, requiring greater device resources, but virtually impervious to counterfeit attempts is based on an enhanced interrogation/response signature hash encryption approach, is referred to herein as the Signature method. This is detailed below as referenced by the Enhanced-Defense Features sections.

An auxiliary capability enabled by similar resources to the above device authentication methods is included herein which further augments board level intrusion defense for resources to which the subject devices are connected. Such innovations are referred to herein as the Anti-tamper feature, beyond the primary device authentication objective. Given that accessibility to programmable resources in a modern circuit (such as EPROMs, CPLDs, FLASH's, FPGAs, etc.) is often facilitated by scan-able devices (typically provided by JTAG visibility features) implementations herein include a Signature method enhancement leading to a gateway to overall board security. That is, by adding device resources to block access to programmable board elements based on valid authentication, effective defenses against clandestine board exposure or behavior alteration are implemented. Such embodiments can serve as an anti-tamper lockout prohibiting re-flashing or similar program content alterations. The latter represents a primary dominant intrusion method for circuit behavior corruption, including the introduction of firmware viruses/Trojans or similar usurpation of programmable logic. Therefore, beyond detection of counterfeit devices, additional features can protect against damaging stored memory accessibility on the board, as detailed below.

As set forth in more detail below, aspects of the present innovations pertain to a first approach related to exploiting the growing trend among IC fabricators of inserting a unique electronically readable but unalterable identification number, such as an "Electronic Chip ID" (ECID), into each of their physical chips. The ECID value is guaranteed by such fabricators to differ for each device instance among a given type (devices having a common functional part number). By means of the ECID, each chip die instance as mounted in its package (such as a DIP or flat-pack) can be distinguished from all others. This is the electronic equivalent of the readable text serial number which is often printed on the outside of an IC package, and will be called the ECID approach herein.

ECID or comparable technologies coupled with systems and methods herein, which may include cooperative information and testing by IC fabricators and PCB manufacturers, enable greater validity and security via more reliable device authentication. Authentication according to the present innovations may involve steps and/or information associated with both board assembly processes, such as those performed at board manufacture, and re-authentication processes, such as those performed at an unlimited number of post-manufacture and/or deployed-site test sessions. Here, such board assembly processes involve authenticating board installed devices, which may include memorializing their mounted placements. Post manufacture and/or deployed-site processes may involve a variety of aspects to confirm the unchanged device suite, e.g., to defend against unauthorized device substitutions in the field.

An even stronger second authentication approach is also provided herein which may be applied in addition to or instead of the above ECID device tagging approach called the Signature method. Although implementations relating to this approach may require greater resources within each supported device, they afford even stronger resistance to counterfeit efforts, being virtually impervious to such device substitutions. Such implementations may be based on inclusion in each device of features of inserting an arbitrary interrogation code (AKA a challenge code), which is combined with a totally hidden and unreadable unique internal seed value. These codes may then be internally processed into a readable signature hash encryption output definitively identifying the specific device. Without knowledge of such hidden seed code, prediction of such output for an arbitrary interrogation code is impossible by practical means, essentially providing bulletproof authentication validation.

Implementations of one or more of the ECID based approaches herein may involve the following steps for each unique circuit board/assembly/system, as typically identified by its own distinguishing serial number:

1. Generating or processing information provided via electronic/automatic extraction of the set of ECID codes and their specific positions (U numbers) on a given board.
2. Obtaining/utilizing information regarding proprietary ECID data for use in the authentication process. This information may include knowledge of the authentic set of unique ECID codes delivered (in securely documented lots) to populate a given board. This information may also include knowledge of the universe of legitimately shipped ECIDs of a given device type, e.g., to assure each number's uniqueness. Here, such information may be used to double-check for non-duplication of components over the supply chain from the legitimate IC fabricator. As a function of such information, systems and methods herein may automatically attest that a newly assembled board contains only authentic ECID components for supported devices.
3. Performing an initial authentication process that utilizes information regarding authentic/unique ECID codes of devices delivered to populate the board to obtain a reference record of the device. Here, the reference record may include an association between authenticated devices and placement of the devices for/on each board.
4. Authenticating that the board contains only legitimate ECID devices. Present systems and methods, here, may re-authenticate the board/devices via test sessions, which may compare extracted codes at known positions against the reference record. Such comparison may be repeated as needed during a board's device re-authentication test session(s) over its useful life-cycle. It further enables tracking a possible re-usage of a given device from a prior board installation to another, a common practice via device salvaging activities (legitimate or not). This could serve as an aid in detecting and isolating supply chain operators engaged in such behavior.

After assembly, e.g. for devices applicable to these ECID implementations, each instance of a board type with its own serial number has a set of ECID enabled chips, each having its unique readable code at a given mounted position. These ECID values may be initially extracted for device validation, having originated from securely documented lots during the board manufacture. After recording their positions, later re-authentication sessions may re-extract each ECID and thereby check its mounted position for a given board. Even a counterfeit IC maker who might incorporate such readable codes would need to assure proper placement distribution over the set of boards to avoid detection. By means of such later re-authentication operations and associated features, present systems and methods further confound post-deployment device substitution attempts.

Systems and methods of authentication herein include implementations that do not rely on assistance from embedded firmware (another security vulnerability point, such as by viruses/Trojans infestation). Instead, such implementations may scan device ECID codes to an external scan controller instrument (referred to as "instrument" hereafter) to acquire ECID and/or position information, without assist from program code. Such scanning may be performed via Joint Test Action Group (JTAG) boundary scan directly, or via a CPU debug port, such as the Enhanced JTAG (EJTAG) or Computer Operating Port (COP) available on many microprocessors, by commanded reading using JTAG emulation means.

The present approaches may be utilized with any amenable circuit boards, such as those having accessible JTAG ports and/or other configurations as regularly employed in current industry practices, and may involve automatic JTAG test scans applied to such boards. The approaches set forth below may totally avoid supply chain counterfeit device substitution risks by focusing authentication solely at the device fabricator and the printed circuit board (PCB) assembler end-points. Risks and concerns associated with intermediate delivery paths and handlers may be averted. Further, implementations herein may avoid dependence on stored firmware or other alterable code content in the target board, given vulnerability to corruption and deception (e.g. viruses/Trojans). Aspects of the present innovations may also avoid the need for any special circuit hardware or design components (such as Trusted Platform Module (TPM) devices), beyond the provision of common device access such as JTAG scan functionality, which supports the methods described herein.

ECID Authentication Processes

According to various embodiments herein, processes of ECID authentication may be considered in two processes or phases, an initial authentication process (also referred to as 'phase 1', below) and a re-authentication process (also referred to as 'phase 2'). While these two processes are described herein as separate phases to facilitate description, implementations herein may reside over various portions of one or both of these phases. As such, the present innovations need not perform or involve both phases, but may instead merely process information related to just one phase, or to portions of both phases, etc. Here, for example, various innovations may be directed to the second phase while only processing information obtained from a third party regarding the first phase, and vice versa.

As described herein, a first or initial authentication phase may comprise extraction of ECID device codes installed on a board enabling confirmation of valid IC membership in a delivered lot from the fabricator at build time. The recordation of such authorized ECID codes, which can also be recorded with their mounted board positions (U numbers), may then be utilized to provide a reference record for future board ECID extraction and validation. This initial authentication process may be engaged once, upon placement of IC's onto a PCB at the factory, yielding a reference record for later comparison(s).

FIG. 1 is a diagram of an illustrative initial authentication phase and associated information processing, according to a disclosed implementation. Referring to FIG. 1, an initial authentication process may be performed in the context of a system including an IC fabricator 102, a board factory 108, and a Trusted Authentication Site (TAS) 105. The TAS 105 may be a site run by a third party entity, for example, and may comprise one or more servers and/or other computing components. With regard to some high level aspects of FIG. 1, a device supply chain 111 exists between the IC fabricator 102 and the board factory 108, the TAS 105 may include and/or access various information 103/104, and various network 101 or other communication channels are provided between the TAS 105, IC fabricator 102 and the board factory 108. Further, the TAS 105 may maintain, process or access information regarding the delivery lot ECID code lists from the IC fabricator 102 enumerating device content. These may be permanently stored as subsequent lots are packaged and shipped. As a security augmentation, such lot lists may be unpublished and available only to TAS as identified by authorized shipment recipients (usually the board manufacturer). In such usage, each lot package may be marked with an encrypted identifier such that its plain text lot number is knowable only to authorized recipients, in possession of a decryption key. This key would enable converting the encrypted lot marking into a plain text lot number as defined by the IC fabricator. By conveying such decrypted plain text lot number to TAS, the latter is enabled to perform ECID code content lookup to establish authentic device lot membership. Thus, only TAS can confirm the correct lot ECID content, based on requests from authorized device receivers (holders of the decryption key). Additional details regarding initial authentication processing, such as that shown in FIG. 1, are set forth further below.

The second authentication phase constitutes a re-authentication session of a given board by re-extracting ECID codes and placements to confirm against the above record. As set forth in more detail below, aspects of these two phases enable continued validation of the board device suite over its lifecycle. Further, the re-authentication may typically be repeatedly engaged any time after the board initial authentication session, including at field deployment sites, to re-establish trust in devices under test.

Figure 2:
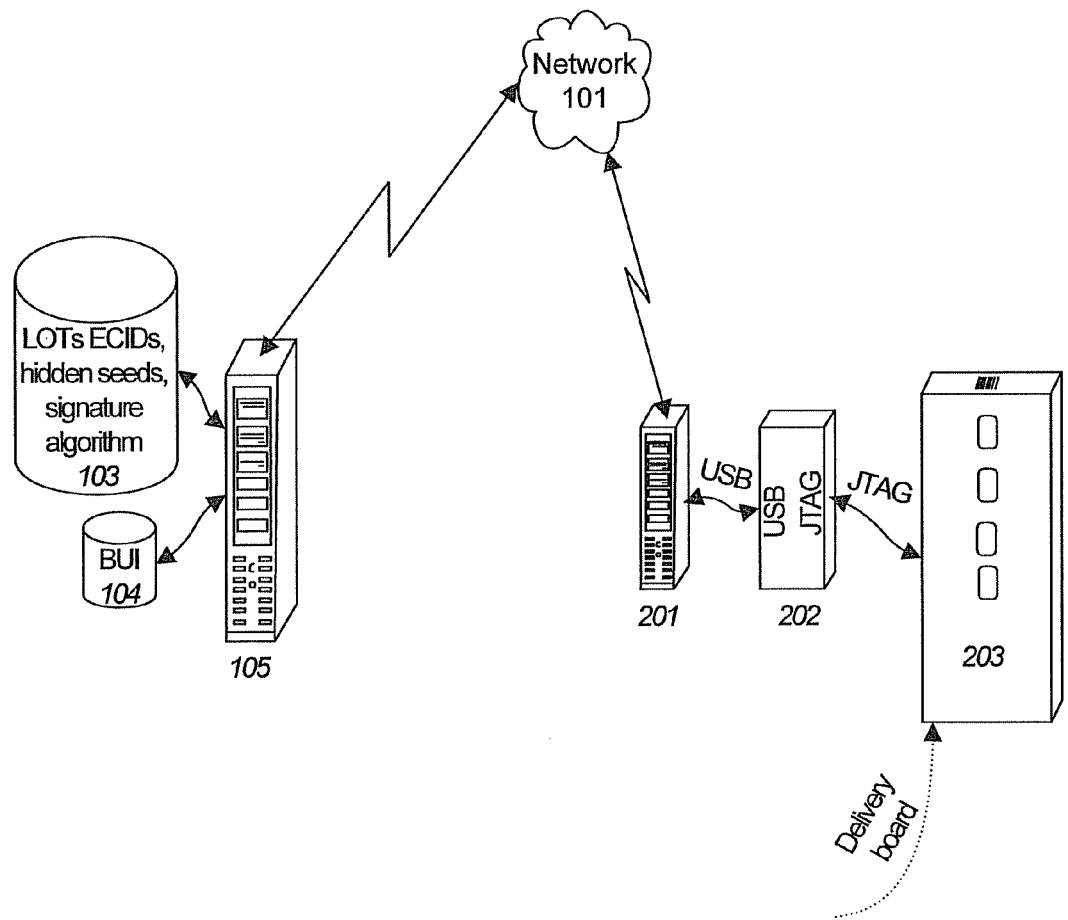
FIG. 2 is a diagram of an illustrative re-authentication system and method involving a scan controller instrument and a network according to a disclosed implementation.

FIG. 2 is a diagram of an illustrative re-authentication process using a scan controller instrument over a network, according to a disclosed implementation. Referring to FIG. 2, system elements of the illustrated re-authentication process may include the TAS 105, a re-authentication component 201, a scan controller instrument or scan instrument 202 that scans the target board 203, and communication channels or interconnections such as one or more networks 101 and couplings such as JTAG, USB, etc. connections. While additional details of the embodiment of FIG. 2 are set forth in more detail below, it is noted that various other embodiments and configurations are within the scope of the present innovations. In addition to the above and alternate embodiments expressly disclosed herein, the re-authentication components and/or scan instruments may be arranged or distributed in various other configurations. For example, systems and methods of re-authentication herein may also include features and functionality set forth in application Ser. No. 12/641,627, filed Dec. 18, 2009, published as US2010/0180169A1, and provisional application No. 61/484,587, filed May 10, 2011, which are incorporated herein by reference in entirety.

Scanning Systems and Methods

When the relevant ECID codes are available via a JTAG scan chain, device ECID code extraction may be performed by conventional JTAG scanning. Here, for example, the ECID codes and their U number positions may be shifted out using boundary scan methods. In other cases, such as where ECID codes may be indirectly accessible by embedded CPU input/output reads and a debug port is provided, they may be extracted by test emulation and diagnostic methods. These methods may employ JTAG scanning to operate the CPU via such exposed test features, commanding the code readout.

The ECID code may normally be accessible to a JTAG scan system by means of scanning out a defined register whose content can be read out, similar to legacy registers, such as IDCODE. Supporting devices may have such ECID register defined as a JTAG protocol extension (e.g. ECIDCODE), as commonly included in the published device BSDL (Boundary-Scan Description Language) file. By scanning such related JTAG instruction into the protocol Instruction Register (SCAN-IR state path) this register is selected to be shifted out during a subsequent SCAN-DR state path sequence. Just as the legacy scanned in IDCODE instruction selects that register for SCAN-DR access, so a similar scanned in ECID-CODE instruction selects access to its ECIDCODE register.

Certain implementations enable concurrent authentication of a multiplicity of boards and/or systems using the boundary scan operation by chained hookup. Given that JTAG, or similar protocol, performs operation on a series of one or more devices with a few signals, while enabling the focus on any one device at a time in the chain, these implementations facilitate authentication of virtually an unlimited mix, count and complexity of target boards/devices with as few as a one TAP (JTAG Test Access Port) test point connection.

These JTAG hookups are commonly available in modern circuits, supporting a variety of other legacy testing and initialization capabilities besides the innovations herein. As such, the present innovations may provide a highly practical and virtually transparent enhancement of existing automatic test systems in the circuit board assembly process. As an augmentation to existing automatic JTAG production testing (interconnect opens/shorts, present/working IC's/passives, at-speed functional testing, comprehensive memory testing, programmable device loading/validation, etc.) the additional manufacturing burden for device authentication is minimal. Authentication time is also achieved quickly (on the order of a few seconds) for the predominantly automatic approaches herein.

Turning back to FIGS. 1 and 2, the present implementations may also include features for managing associated information and/or database files 103. Here, for example, such database files may be stored in libraries, which may be configured to store the various information set forth herein such as IC fabricator shipped lot contents, board authentication information, etc. The lot information may include lists of ECID codes contained within each distinct shipped lot. Board information may also include identifying ECID code information, e.g., as placed on each instance, referred to herein as Board Unique Information 104 ("BUI"). Increased security may be provided in such embodiments by concentrating this information and its management as well as authentication processing in a network accessible server, hosting a worldwide Trusted Authentication Site (TAS) 105. Such approaches keep sensitive information maximally localized and isolated from public exposure, while offering the authentication resources in a central focal point service.

Hardware and Other Physical Components

Systems and methods herein may involve or operate as a function of certain physical aspects being available. For example, some embodiments may require specific hardware, configurations and/or other features to support testing at one or both the IC and/or circuit board levels.

Integrated Circuit:

With regard to IC enabling features, chips supported by certain implementations herein must be fabricated to contain readable numerical ECID codes which are unique per device instance over the family of such device type. Here, for example, such codes must not be duplicated for any chip of a given type (typically defined by a particular functional part number). In some embodiments, such ECID codes must be read-only and extractible by electronic means, e.g., via JTAG compliant boundary scan or by JTAG protocol CPU debug access, such as the EJTAG or computer operating port (COP) available on many microprocessors. This latter access enables commanding the processor (CPU) as an emulation slave by an external instrument (JTAG scan controller) to perform input/output operations under its control. Other non-JTAG embodiments may be accommodated, consistent with the disclosure below.

Circuit Board:

With regard to accessing circuit boards, various ports and/or access connection technologies may be utilized to provide access by external instruments. In some embodiments, for example, supported circuit boards must expose a JTAG scan chain with an appropriate access connector enabling external instrument hook-up. One or more of such chains would provide access to all IC's to be authenticated. If the CPU debug port approach is used, this chain may consist of little more than an attachment to that device alone. All combinations of JTAG chaining and access methods are applicable. Other non-JTAG embodiments may also be utilized, as described below.

Bare Chips:

In some cases, it may be desired to extract ECID codes from one or more uninstalled bare devices (not yet mounted on a PCB). Here, sockets or test jigs may be employed such that devices are momentarily activated, connected to the instrument and scanned. These features may be useful, e.g., for the readout of devices prior to a board position installation such as in a receiving depot. Further, such verification may be used to enable a preliminary confirmation of membership in an officially delivered and documented lot. These implementations may also be involved with ECID chip testing and/or readout processes, i.e., for uninstalled devices. These approaches are somewhat tangential to the board device authentication innovations herein, though yield various useful and secondary applications.

Information Flow and Processing

Aspects of the present innovations may employ a JTAG instrument that is appropriately connected to the subject board's JTAG scan chain(s). In some embodiments, the JTAG instrument may be operated by a client PC running a dedicated test software tool connected to the instrument via a standard link, such as USB, etc. In these embodiments, the testing may be coordinated with the TAS 105 via a network, and may include features such as uploading or processing target board serial numbers, extracted ECIDs/positions, device types, and/or related decrypted lot numbers. Functionality performed in connection with the TAS 105 may also include downloading authentication attestation outcomes and downloading the latest lot decryption key from time to time.

According to some implementations, a lot decryption key may be distinct per board manufacturer, and may change over time. This arrangement allows only registered manufacturers to convert the encrypted lot number marked on delivered device shipments into unencrypted IC fabricator lot numbers, referencing the ECIDs content. This latter information (e.g. ECID content list) may be retained in the TAS as referenced by the unencrypted lot number, enabling confirmation that installed IC's are authorized. These features may impede the interception of lot packages and substitution of counterfeit device packages with the same ECID set, since this information is not publicized. Such key (e.g., password, or like security feature to enable access) is only required during the initial authentication phase, when newly installed IC's are authenticated, utilizing one of many standard decryption conversion methods from the encrypted lot marking to its plain text value. The plain text lot number may then enable TAS to lookup the correct secret ECID content of the related lot, confirming authenticity and veracity of the requestor (decryption key possessor). Further, during this same initial authentication phase session, such validated devices are recorded as actually placed on each board for later reference. Moreover, in some implementations, once device authenticity is established (e.g., valid membership in the device lot as applied to the board), and its final mounted position is known, such lot membership confirmation need not be repeated (such as for re-authentication) given the memorialized valid ECID and board-position association.

Later re-authentication sessions need only provide the subject board serial number and re-extracted ECIDs/positions in order for the above record to confirm the board as unchanged from its original constitution.

Turning back to FIG. 1, various features and information flow associated with the illustrated system are shown. In some implementations, the TAS 105 may be configured to maintain the IC fabricator's lot ECID code lists. These lists may be permanently maintained as subsequent lots are packaged and shipped, and may be stored locally or in other secure environments. Further, in embodiments where the published lot number does not accompany the shipment (e.g., to hide the ECIDs contents), it may be included as only as the encrypted version such that the contained ECID population remains unknowable throughout its transit, regardless of path or supply chain variability. The TAS may also provide a decryption key to authorized lot receivers enabling conversion of encrypted to plain text of the lot number, enabling TAS lookup of the ECIDs content per board assembler request. The TAS server may also be configured to accept and incorporate new securely conveyed lot information, e.g. in a storage library, at the behest of the IC fabricators. This may also include processing and/or recording of associated data, such as the list of ECID numbers contained in each lot shipped, which may facilitate their lookup in the authentication process.

Additionally, in the course of merging new lot information (e.g. from the IC fabricator), the TAS may perform uniqueness checking of such numbers against previously collected lot ECID values, further defending against counterfeit intrusion attempts. Such features may defend against counterfeit devices entering the supply chain with duplicate numbers, making suspect all such duplicate devices having gone through the authentication sequence. Once ECID numbers are established/logged, they are highly trusted given the secure conveyance in the lot contents list from the IC fabricator, having assured their reconfirmed uniqueness among all ECID numbers of this type device, as recorded among all lot numbers.

The TAS 105 may also communicate with the board manufacturer, at least during the initial authentication session, upon each board being fully stuffed with components. During this session, for example, the TAS 105 may receive information about such board, including its type, serial number, the decrypted lot numbers of the ECID devices just installed, the extracted ECIDs/positions, and the various device types per the board's final population. The TAS 105 may also be configured to create and/or maintain resulting board unique information (BUI) for later reference. Here, for example, the TAS may record each board's validated device ECIDs, positions and types, along with its board type and serial number, among other things.

During a subsequent phase or session of authentication (e.g., after phase 1 by the board manufacturer or during later re-authentication testing), the TAS again may receive board serial number, re-extracted ECIDs/positions and/or device types, enabling comparison to the above record.

The TAS 105 may also be configured to communicate with the board manufacturer or test tool to download authentication attestation outcome (pass or fail), as well as to perform housekeeping and/or management interactions. The latter may include directing the sequence of testing when the local scan controller instrument is appropriately configured for remote operation. Such processing may also include interaction communications between TAS and the local processor and/or scan controller instrument for the conveyance of information, the launching of the authentication process, and the indication of outcome. Further, to increase security and aid in forensic discovery of violations, the TAS may maintain records of test sessions, including identification of test requestors. Thus, anomalous events, such as a given ECID appearing on wrong boards or positions, or duplication of an ECID code, may be flagged to alert possible investigative follow-up.

At the board manufacturing facility, the serial number of each board being stuffed and the encrypted lot number of devices supplying it must be suitably acquired for electronic conveyance to the TAS. In some embodiments, such processing may be fully or partially automatic, including using optical scanning of packaging barcode encrypted lot numbers and the board PCB serial number. As a function of the lot key information provided, third parties such as board manufacturers may convert the read encrypted lot number into the unencrypted plain text electronic version for uplink to the TAS.

Authentication Processing

As discussed above, device authentication may involve two interrelated phases based on the board's state of production or deployment. Extraction of the ECIDs/positions may be performed with the subject devices installed and electrically functional. Therefore, phase 1 may typically take place upon completion of board assembly, with all devices mounted. This enables the initial authentication session where device ECID codes and placements can be extracted by the instrument, e.g., for checking and recording.

Phase 2 refers to test sessions where re-authentication of devices is performed to gain trust that the board's device suite remains valid. Phase 2 testing may require that phase 1 was already performed, with reference information available to compare extracted information. Phase 2 may occur while the board is still in the factory prior to shipping (as a final confirmation), or in later settings, such as in field deployment, or at repair locations or depots.

In addition to the above authentication processing, the TAS 105 may also be configured to perform various background and/or periodic tasks, such as maintaining and/or providing distinct device lot decryption keys to each authorized and registered board manufacturer. These features may be used in conjunction with methods where shipped lot package identification are encrypted, useable only by selected manufacturers. Such features enable further defense against lot counterfeit substitutions.

To provide even greater security, decryption keys may be configured to become inactive after some period, requiring replacement. More exotic security schemes may also be employed, such as providing tailored keys such that specific manufacturers are limited to decrypt lot ID codes only for their associated devices or lot shipments. Since the decrypted lot number enables secure access in the TAS to its sensitive device ECID list supporting assembled board device authentication, such features provide another layer of security to such access. The confinement of such secret information in the TAS, wherein it may only be processed internally and never to be conveyed elsewhere, further reinforces the strength of this security approach.

Illustrative Authentication Processes

The following describes several illustrative step-by-step processing performed in an initial authentication phase (phase 1) and a re-authentication phase (phase 2), according to one or more implementations herein.

Figure 3A:
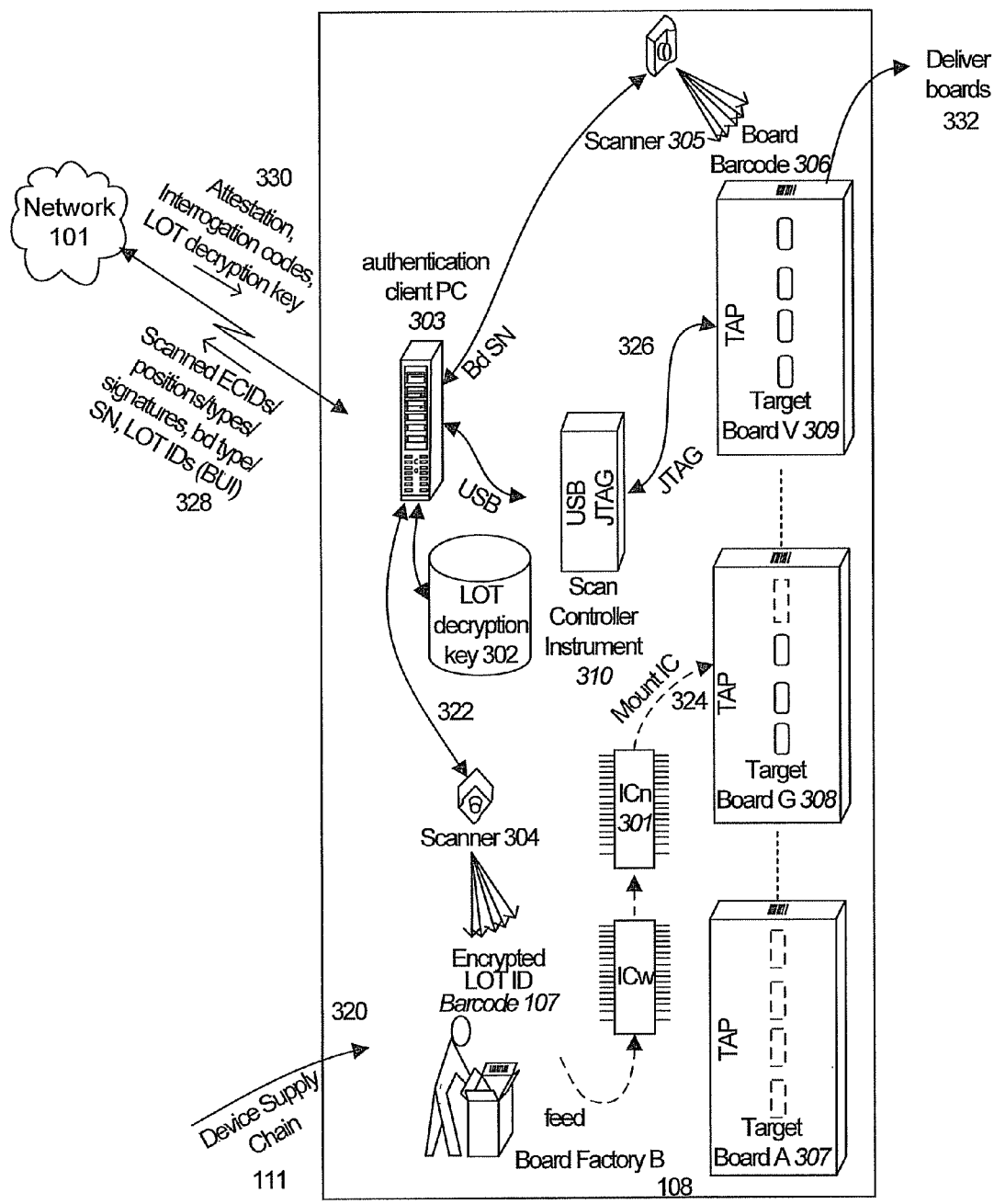
FIGS. 3A and 3B are diagrams of other illustrative initial authentication systems and methods as well as associated information processing according to a disclosed implementation.

Detailed Phase 1 (Initial Authentication) Processes:

FIG. 3A is a diagram showing further details of an illustrative initial authentication process and associated information processing according to a disclosed implementation. Referring to the system of FIG. 3, various elements of the board factory 108 are shown, including target boards 307, 308, 309, one or more processing components 303 such as a client PC, a scan controller instrument 310, a component that stores and/or accesses IC/device information 302 as well as identification equipment such as barcode scanners 304, 305 used to identify parts, boards and other components. In the implementation shown, the component that stores and/or accesses IC/device information 302 may be, for example, a database that stores information such as LOT decryption key information. While aspects of the process below are described in connection with FIGS. 1, 3 and 4, the innovations herein are not limited to any specific features illustrated in the drawings. Accordingly, an initial authentication process may include one or more of the following steps:

1. IC Fabricator 102 packages ECID bearing ICs into indivisible shipping lots with a known set of ECID codes. In some implementations, the codes included in such shipments are not numerically related (avoiding regular pattern sequences) and/or are maximally randomized, to confound attempts at inferring their values.
2. Each lot package 106 is assigned an ID number. Its ECID content list is electronically recorded for secure conveyance to the appropriate recipient (e.g. the TAS, board factory, etc.) upon shipment, and this information is not included with the package.
3. Each lot package is marked with an encrypted version of the lot number 107, for example in an automatically readable format, such as a barcode. Further, the encryption scheme may be compatible with a keyed decryption method for later conversion at the board manufacturer.
4. The IC Fabricator ships the product using the global supply chain 111.
5. The IC Fabricator securely conveys the corresponding ECID list to the recipient (e.g., TAS, etc) for processing/handling, such as recording in a library of information.
6. The board manufacturer 108 purchases and receives the IC's 320, e.g. using the global supply chain 111, in multiples of lot increments.
7. The board manufacturer 108 reads each encrypted lot number, e.g., using an optical barcode scanner 304 and scanning process and/or other methods allowing automatic information handling. Here, for example, the encrypted LOT ID may be provided 322 to the authentication component 303 for handling.
8. The board manufacturer 108 decrypts each lot number by virtue of a key code provided from the IC fabricator (e.g., via TAS), resulting in the electronic plain text lot number.
9. The board manufacturer reads the serial number of the board currently being assembled, e.g., using an optical barcode scanner 305 and scanning process and/or other methods allowing automatic information handling.
10. For each ECID-bearing IC mounted onto a given board 324, the manufacturer records the device lot number which contributed to such board, being one of its component sources.
11. Upon completion of board assembly, e.g. when it may be activated and JTAG scanned, the board manufacturer connects and operates the instrument to extract the ECID codes and their mounted positions 326.

12. In TAS implementations, the board manufacturer 108 securely uplinks to the TAS one or more pieces of the following collected information 328 related to the completed board:
   a. manufacturer registration information authorizing its access to the system.
   b. board serial number.
   c. board type (part or model number).
   d. For each ECID mounted device type (part number), lot numbers contributing to its assembly.
   e. For each ECID mounted device and type, its extracted ECID code, and position (U number).
13. The board manufacturer requests the TAS or associated entity to apply the supplied information in the performance of a device authentication process.
14. The TAS checks each ECID confirming its membership in one of the lots which supplied the board components, assuring its validity.
15. The TAS checks each ECID of a given device type as being unique and not repeated among all devices checked before.
16. The TAS securely records all the board unique information (BUI) in a record among those for all boards of its type, for later reference, saved in a library.
17. Upon successful completion of steps 13 through 15, the TAS conveys a message 330 to the board manufacturer, attesting to ECID devices authenticity. Otherwise, a failed outcome message is conveyed.
18. The TAS records the above test event including all detailed information exchanged, the time/date, and the identification of the tester.
19. Upon receipt of a positive authentication message from the TAS, the board manufacturer treats this board as acceptable for further processing, including later possible re-authentication and eventual delivery 332.

Figure 3B:
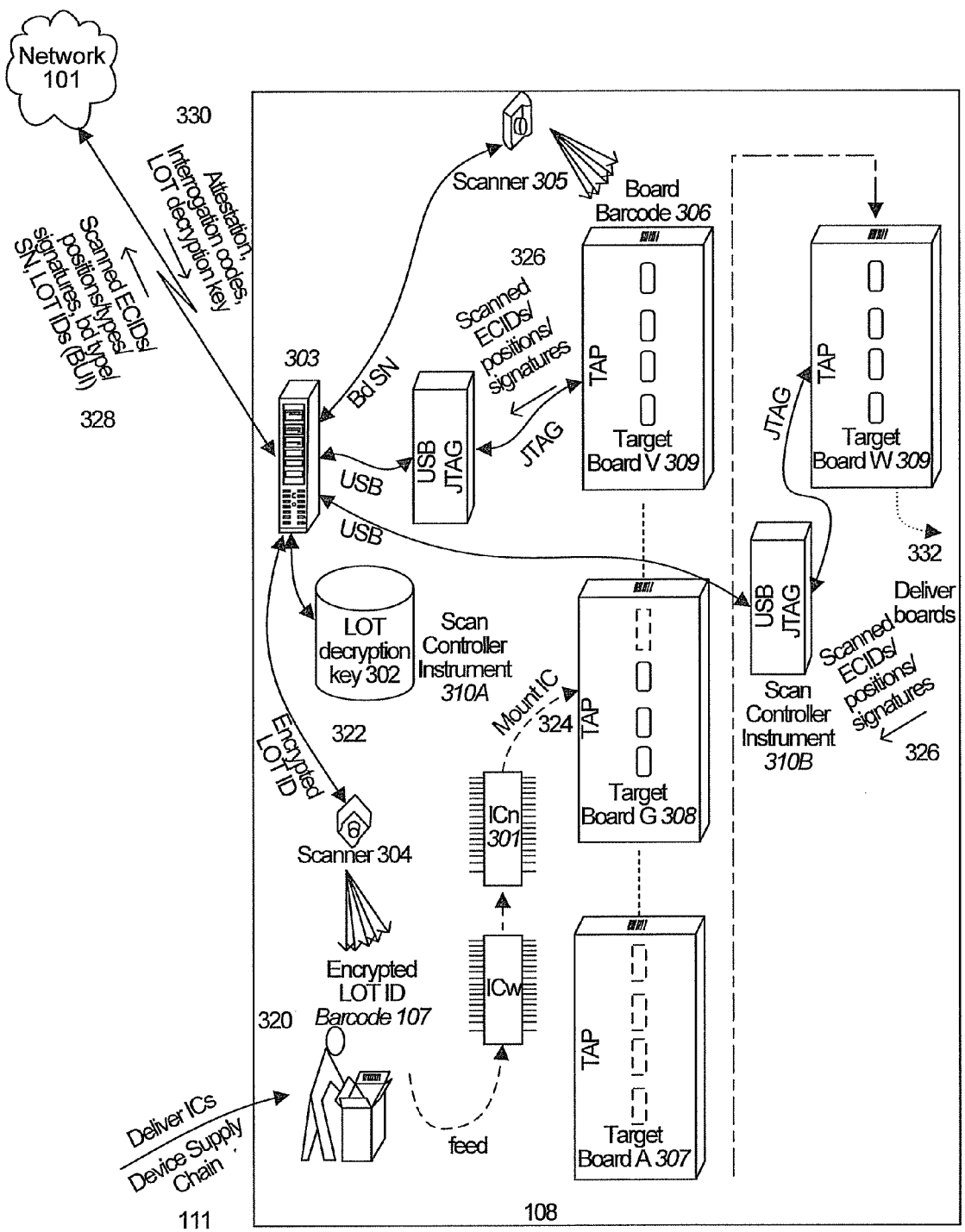

FIG. 3B is a diagram of an initial authentication system and method much like that of FIG. 3A, though further disclosing a re-authentication process occurring within the board factory 108. Namely, the target board 309 may be connected to a scan controller instrument 310B within the board factory 108. Here, as set forth in more detail elsewhere herein, re-authentication information may be acquired via scanning of ECIDs, positions and/or signatures 326 prior to delivery of the boards 332.

Figure 4:
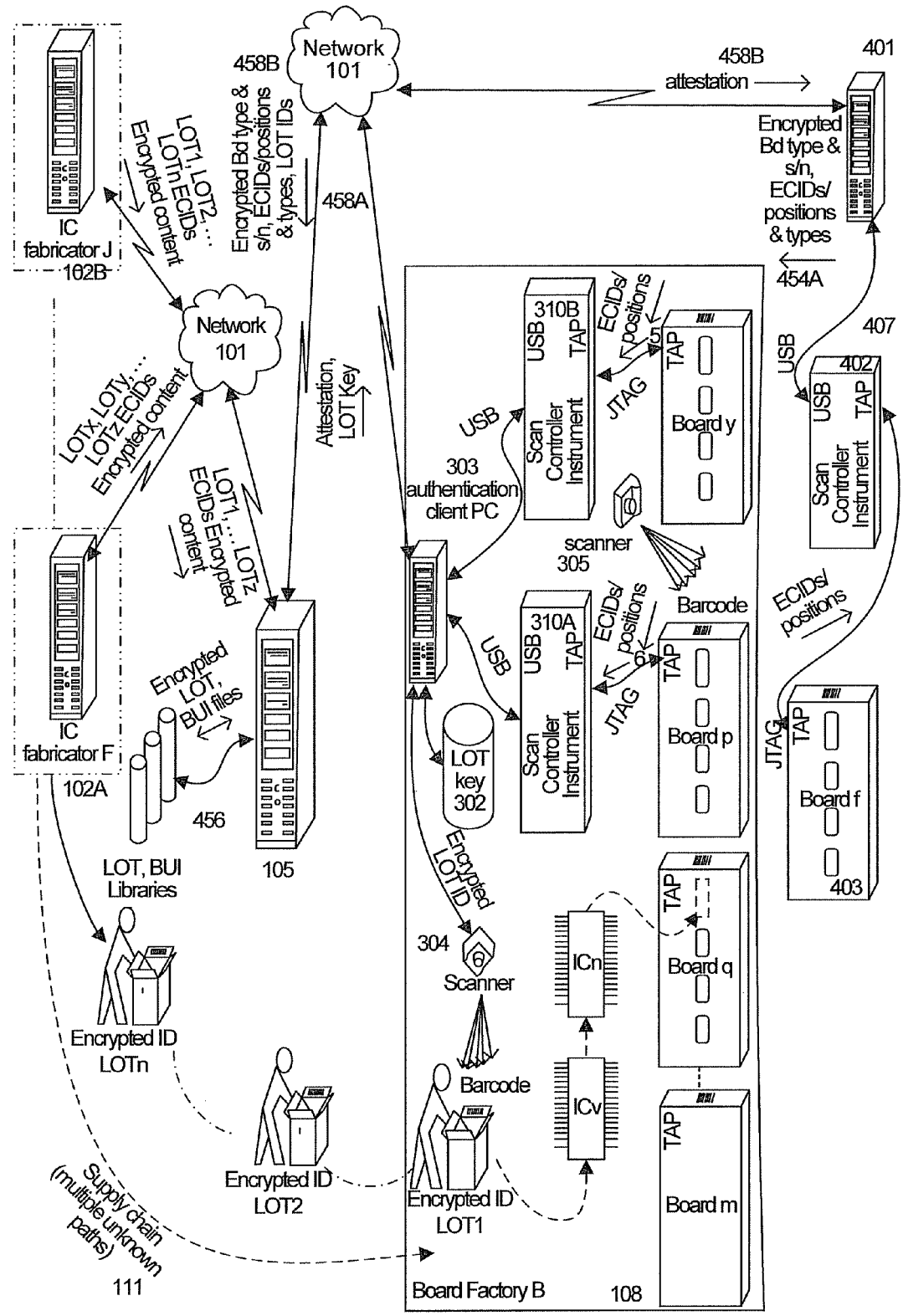
FIG. 4 is a diagram of an illustrative overall authentication system and associated processing, according to a disclosed implementation.

Detailed Phase 2 (Subsequent Re-Authentication) Processes:

FIG. 4 is a diagram showing further details of an illustrative overall system and processing, including features of the exemplary re-authentication process set forth below, according to a disclosed implementation. While the re-authentication processes discussed immediately below relates to field-deployed re-authentication shown on the right side of FIG. 4, re-authentication within the board factory 108 is also shown in the drawing. Referring to FIG. 4, various elements of an overall system 400 are shown, including details of the board factory 108, a remote site 407 such as a field deployed test site, as well as features associated with the TAS 105 and the transmission of data over the network(s) 101 between all of the various system elements. While various aspects of the illustrative re-authentication process below are shown in FIGS. 2 and 4, the innovations herein are not limited to any specific features illustrated in the drawings. Accordingly, a re-authentication process may include one or more of the following steps:

1. Scan instrument 402, 202 under management of a test component such as a client test PC 401, 201 is connected to the JTAG TAP port of the activated target board 403, 203 to be re-authenticated.
2. The test operator provides the target serial number and board type, such as by entering it into the client test PC 401, 201 (typically by keyboard or by other/similar means . . . e.g. barcode scanner).
3. The client test PC 401, 201 directs the instrument 402, 202 to perform JTAG scanning of the target to extract all ECID codes and their board positions 452 (U numbers).
4. The client test PC securely connects to the TAS 105 and uploads 454A, 454B collected information related to the target, such as:
   a. board serial number.
   b. board type (part or model number).
   c. For each ECID mounted device, its device type, extracted ECID code, and position (U number).
5. The client test PC requests the TAS to apply the supplied information in the performance of a device re-authentication process.
6. The TAS securely reads 456 the board unique information (BUT) from a record among those for all boards of its type, based on its serial number.
7. The TAS compares the board ECID numbers and placements to verify their unchanged status.
8. Upon successful completion of step 7, the TAS conveys a message 45a, 458B to the client test PC, attesting to ECID devices authenticity. Otherwise, the message conveys a failed outcome.
9. Upon receipt of an authentication outcome message from the TAS, the client test PC indicates such to the operator, who then treats this board accordingly. Here, for example, a failed outcome may yield need for board repair or replacement.

Outside of various physical/manual/mechanical operations among the above steps (acquiring lot numbers and board serial numbers, mounting IC's, etc.), the automatic authentication processes herein require on the order of several seconds or less for a common practical board and IC population. Indeed, network communication delays may typically be the dominant time contributors.

Systems and Methods Including Enhanced-Defense Features

Figure 5:
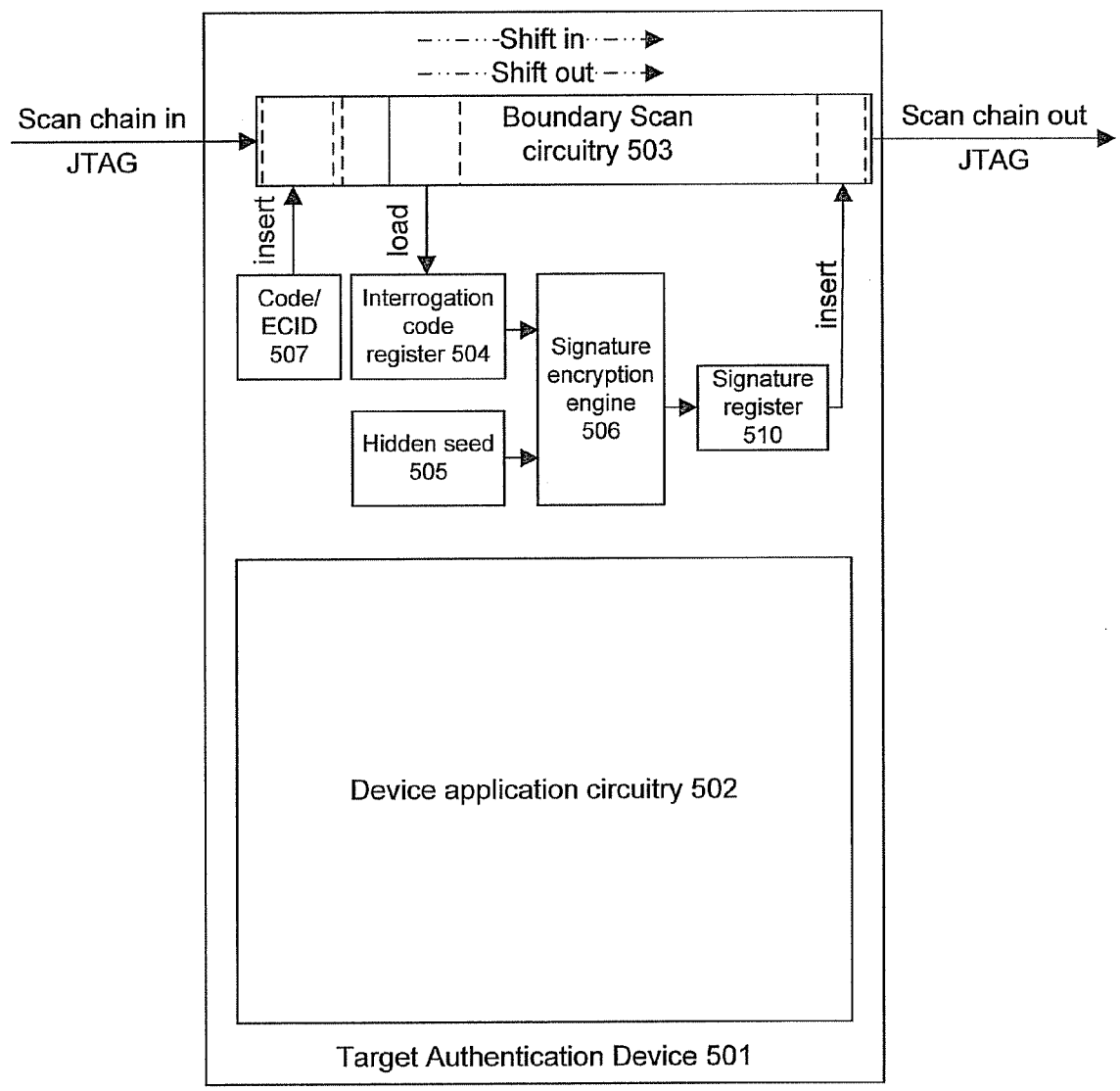
FIG. 5 is a diagram of another illustrative authentication system showing enhanced-defense features according to a disclosed implementation.

FIG. 5 is a diagram of another illustrative authentication process showing an enhanced-defense embodiment according to a disclosed implementation. Systems and methods described herein in connection with FIG. 5 may enable stronger defenses against counterfeit part substitutions. These enhanced defense implementations may come at a greater cost and effort in the IC fabrication process due to increased complexity and features required (i.e., beyond the basic authentication features set forth above). However, such features may radically improve the defense against substitution, such as in situations when the otherwise correct ECID is loaded into a counterfeit device.

Referring to FIG. 5, illustrative target device features associated with an exemplary enhanced defense implementation are shown, including a target device 501, its device application circuitry 502, boundary scan circuitry 503, an ECID component 507, an interrogation code register 504, a hidden seed 505 and a signature encryption engine 506. These features, such as the ECID and the hidden seed, may be hard-coded into the target device 501. By inclusion of such features and their associated functionality, as described in more detail below, enhanced defense implementations defend against the interception of shipment lots prior to board factory assembly, e.g., when such lots might be replaced with counterfeit devices having ECID codes copied from the authentic devices. While such interception may require highly sophisticated and resourceful operators due to the complexity involved, given sufficient motivation and effort, this is a real and viable threat, especially where clandestine disruptions or usurpations are the overriding goal with little concern for costs.

Moreover, if such counterfeit devices exhibit the proper ECID codes upon scan-out, they become undetectable once their replacements are imbued with the same set of numbers. Such alternate devices could then be forwarded to the board factory where they might contaminate the product population. In such case, the presence of readable ECID codes is rendered useless in defense against counterfeit substitution, hence the enhanced method may be superior.

To combat such counterfeiting, enhanced-defense implementations may include, in each device, one or more components for computing encrypted scan-out signatures based on a numerical starting value (e.g. hidden seed), such as a signature encryption engine 506, to indicate its authorized status. Each device may include a hidden, distinct-per-device, unalterable and unreadable code 505 (similar to the publicly observable ECID) serving as a seed to the signature process. Being unreadable while contributing to the signature output renders this resultant code unique and not practically reproducible to a counterfeit copier. Further, these implementations may also involve an interrogation (or 'challenge') code that is scanned in, e.g., as loaded into an interrogation code register 504, and which contributes to the signature creation along with the hidden seed 505. The net result is a highly scrambled, scanned-out code which is a function of an arbitrary scanned in code, but with no discernable relationship. These features and components may be implemented as embedded hardware, firmware or any combination thereof so long as it may not be externally altered. In addition, while they are all shown within the target device 501 in the illustrated implementation, aspects of these features, such as some of the associated scanning handshake functionality may be distributed to other elements in the test system, such as the scan instrument, TAS, etc.

The above interrogation and signature registers would be defined as extensions to the standard JTAG register set, selected by loading appropriate new instructions into the Instruction Register (via the SCAN-IR state path), commonly published in the device BSDL file (e.g. INTERROGATION, or SIGNATURE, similar to IDCODE or ECIDCODE). The content of the interrogation register would then be scanned in, or the signature register scanned out during a subsequent SCAN-DR state sequence following the associated Instruction Register updating.

Since the underlying aspects, e.g., the hidden seed, the interrogation code, and/or the signature algorithm (e.g., an SHA hash encryption engine), are known to the IC fabricator (and thus to TAS), the resulting signature would be totally determinate for authentication by such privileged viewer, yet practically indecipherable and non-duplicative to any other observer. Further, various encryption algorithms with scrambling effects may be used, making it theoretically impossible (in practicable time and computing power) to discern a mapping between the interrogation input and signature output codes. Thus only an authorized observer can pragmatically confirm correctness of the scanned out signature code. Moreover, these implementations may be configured such that every differing interrogation input results in a radically altered output (avalanche effect), greatly confounding efforts to determine the seed (which could enable a pirate to duplicate this in their counterfeit chips). Here, for example, the alteration of a single input bit typically results in a radically differing output signature pattern.

In some implementations, the authentication testing of devices may include the varying of the of interrogation codes each session in a random fashion, to enhance the unpredictability of the output. This is assured since the signature output depends on the internal hidden seed and the scanned in interrogation code. As with the basic ECID implementations above, each hidden seed code value may be configured as maximally random among the set of devices in a lot, and unrelated to the ECID value within each device. Such features may be included to deflect any effort to infer patterns among the devices.

Enhanced-Defense: IC/Hardware Components

Supported chips may be fabricated to contain readable numerical unique ECID codes as above to realize the above capabilities, e.g., as an adjunct to this method. In addition, such devices include a hard-coded unique numerical hidden seed code 505, known only to the IC fabricator. This hidden seed code 505 may be later securely conveyed to and memorialized in a library at the TAS. Implementations, here, may enable loading an arbitrary interrogation code for inclusion in the signature generation process, e.g., using JTAG scan cycles.

Further, enhanced defense systems may include or involve an encryption engine 506 which results in an output signature code (e.g., a hash digest result) unique to the device (as possibly identified by its ECID) for a given interrogation value, based on its distinct hidden seed. The signature pattern will not be readily traceable to the interrogation code by casual observation (or even intense automatic computational means of practical resources and duration). In some embodiments, the interrogation code is loaded by JTAG scan in methods, and the resultant signature code is extracted by JTAG scan out methods, after being automatically computed using the internal hidden seed. The target device may then compute the signature code, available for output scan, either automatically upon receipt of the interrogation seed, or upon command via the scan mechanism.

In implementations where the encryption engine is built into the device, the signature encryption features may be implemented as dedicated logic or a firmware directed processor, or a combination thereof, such as in embodiments where the hidden seed cannot be made externally known. Further, systems and methods may utilize an established standard or standardized set of such signature encryption features for maximum practicality. Here, for example, such standard may include the algorithms themselves and/or features related to the interrogation code, the hidden seed code attributes (but not their values), and/or their scan conveyance sequence.

Systems and methods including such enhanced-defense features along with the authentication functionality below may obviate requirements of the methods set forth above (e.g., using prior encrypted ECID method using shipped lot list comparison, codes uniqueness checking, and comparison record of device board placements). The latter approach in this case is reduced to an auxiliary safeguard augmentation, considered a secondary trust confirmation. Authenticity of installed devices by such enhanced-defense signature techniques alone can be deemed sufficient, being stronger than the above ECID-only systems without enhanced defense.

Enhanced-Defense: Detailed Phase 1 (Initial Authentication) Processes

As a variation to the above-described phase 1 processes, the TAS may download a unique interrogation code for each supported device on a board to be scanned in prior to scanning out its signature. Here, for example, this set of codes may be applied to all devices on the board in a single scan in, resulting in all the signatures output in a single scan out, for a given chain. To further impede the predictability of the hidden seed values, the TAS may provide interrogation numbers which also vary each instance of testing. This results in highly disparate and mangled signature values strongly resisting analysis or discernment by maximizing signature variability. The illustrative processes set forth below include the above ECID-based steps, as well, to enable a maximally robust authentication trust level. In addition, ECID features may provide an automatic means of identifying each device to facilitate the hidden seed lookup in TAS. Without this, a device identifier code (e.g. serial number) may have to be otherwise supplied, including undesirable manual methods. Therefore, the combined ECID and enhanced signature method is preferred, as one or more of the following steps are performed, e.g., instead of the process set forth further above:

1. The IC Fabricator packages IC's bearing ECIDs into indivisible shipping lots with a known set of ECID codes. In some implementations, the codes included in such shipments are not numerically related (avoiding regular pattern sequences) and/or are maximally randomized, to confound attempts at inferring their values. For supporting devices, randomized hidden seed codes are also included in each device and the TAS destined record, associated with each ECID code. Furthermore, for each device type, its signature encryption algorithm features may be recorded, e.g., for uplink to TAS.
2. Each lot package is assigned an ID number. Its ECID content list is electronically recorded for secure conveyance to the TAS upon shipment, and this information is not included with the package.
3. Each lot package is marked with an encrypted version of the lot number, for example in an automatically readable format, such as a barcode. Further, the lot encryption scheme may be compatible with a keyed decryption method for later conversion at the board manufacturer.
4. The IC Fabricator ships the product using the arbitrary global supply chain.
5. The IC Fabricator securely conveys the corresponding ECID list to the TAS for processing/handling, such as recording in a library of information.
6. The IC Fabricator securely conveys the corresponding hidden seed code list to the TAS for library recording. These are unique per device and per instance, unreadable and nowhere publicly disclosed.
7. The IC Fabricator securely conveys the corresponding signature encryption algorithm description for this type of device to the TAS for library recording, although publicly known procedures do not degrade the security effectiveness of this method.
8. The board manufacturer purchases and receives the IC's using the global supply chain in multiples of lot increments.
9. The board manufacturer reads each encrypted lot number, e.g. using an optical barcode scanning process and/or other methods allowing automatic information handling.
10. The board manufacturer decrypts each lot number by virtue of a key code provided from the TAS, resulting in the electronic plain text lot number.
11. The board manufacturer reads the serial number of the board currently being assembled, e.g. using an optical barcode scanning process and/or other methods allowing automatic information handling.
12. For each ECID bearing IC mounted onto a given board, the manufacturer records the device lot number which contributed to such board, being one of its component sources.
13. The board manufacturer requests and securely downlinks from the TAS a set of interrogation codes created for each supported device of the completed board. Such codes may differ between devices and test instances in a maximally random manner, effectively resulting in NONCE behavior, such that signature outputs will vary with every extraction, confounding attempts to determine the hidden seed code.
14. Upon completion of board assembly, e.g. when it may be activated and JTAG scanned, the board manufacturer connects and operates the instrument to scan in the interrogation codes, extract the ECID codes and their mounted positions, along with their signature codes.
15. After scanning, the board manufacturer securely uplinks to the TAS one or more pieces of the following collected information related to the board just completed:
    a. manufacturer registration information authorizing its access to the system.
    b. board serial number.
    c. board type (part or model number).
    d. For each ECID mounted device type (part number), decrypted lot numbers contributing to its assembly.
    e. For each ECID mounted device and type, its extracted ECID code, position (U number), and interrogation code applied to it (e.g., as previously provided from TAS).
    f. For each ECID mounted device, its extracted signature code.
16. The board manufacturer requests the TAS to apply the supplied information in the performance of a device authentication process.
17. The TAS checks each ECID confirming its membership in one of the lots which supplied the board components, assuring its validity.
18. The TAS checks each ECID for a given device type as being unique and not repeated among all devices checked before.
19. The TAS performs a signature code computation for each device based on the interrogation codes it originally provided, the library of hidden seed codes and the encryption algorithm for each device, assuring the validity of the uplinked values by comparison. Such computed signature need not be saved in the BUI since it is recomputed anew each authentication session, changing as subsequent interrogation codes change.
20. The TAS securely records all the board unique information (BUI) in a record among those for all boards of its type, for later reference, which may be saved in a library.
21. Upon successful completion of steps 17 through 19, the TAS conveys a message to the board manufacturer, attesting to ECID devices authenticity. Otherwise, a failed outcome message is conveyed.
22. The TAS records the above test event including all detailed information exchanged, the time/date, and the identification of the tester, in support of tracing unauthorized testing activities or conditions.
23. Upon receipt of a positive authentication message from the TAS, the board manufacturer treats this board as acceptable for further processing, including later possible re-authentication and eventual delivery.

Enhanced-Defense: Detailed Phase 2 (Re-Authentication) Processes

As variation to the above-described phase 2 ECID-only processes, the TAS may download a unique interrogation code for each supported device on a board to be scanned-in prior to scanning out its signature. Typically, this set would be applied to all devices on the board in a single scan in, resulting in all the signatures output in a single scan out for a given chain. One or more of the following steps, which may also include the ECID component, may be performed in place of the phase 2 ECID-only steps set forth further above:

1. The instrument under client test PC management is connected to the JTAG TAP port of the activated target board to be re-authenticated.
2. The test operator enters the target board serial number and board type into the client test PC (typically by keyboard or by other/similar means . . . e.g. barcode scanner).
3. The client test PC downlinks from the TAS a set of interrogation codes for each device of the board, which may be newly created for each authentication session. Such codes shall differ between devices and test instances in a maximally random manner, effectively resulting in NONCE behavior, such that signature outputs will vary with every extraction, confounding attempts to determine the hidden seed code.
4. The client test PC directs the instrument to perform JTAG scanning to the target feeding the interrogation codes, thus launching the signature computations within each device.
5. The client test PC directs the instrument to perform JTAG scanning of the target to extract all ECID codes and their board positions (U numbers) along with signature codes.
6. The client test PC securely uplinks to the TAS one or more pieces of the following collected information related to the target:
   a. board serial number.
   b. board type (part or model number).
   c. For each ECID mounted device, its device type, extracted ECID code, position (U number), and interrogation code applied to it.
   d. Signature codes for each supported device.
7. The client test PC requests the TAS to apply the supplied information in the performance of a device re-authentication process.
8. The TAS securely reads the board unique information (BUI) from a record among those for all boards of its type, based on its serial number.
9. The TAS compares the board ECID numbers and placements to verify their unchanged status.
10. The TAS performs a signature code computation for each device based on the interrogation codes it originally provided, the library of hidden seed codes and the encryption algorithm for each device, assuring the validity of the uplinked values by comparison to the extracted signature.
11. The TAS records the above test event including all detailed information exchanged, the time/date, and the identification of the tester, in support of tracing unauthorized testing activities and conditions.
12. Upon successful completion of steps 9 and 10, the TAS conveys a message to the client test PC, attesting to ECID devices authenticity. Otherwise, the message conveys a failed outcome.
13. Upon receipt of a positive authentication outcome message from the TAS, the client test PC indicates such to the operator, who then treats this board accordingly. Typically a failed outcome infers the need for board repair or replacement.

In implementations wherein the ECID feature is not employed (the signature method is stronger and self-sufficient to provide complete authentication), the TAS will need to identify each device by a unique serial number to enable look-up of its IC-fabricator-provided hidden seed value. In some implementations, this may comprise its serial number, possibly printed on the package exterior. This or related number must be conveyed to the TAS to enable hidden seed lookup as it determines the signature (modified by the interrogation code). Further, such serial number may be readable by automatic means (e.g. camera text recognition), although manual entry techniques may also be utilized. Notably, here, inclusion of the ECID feature significantly facilitates the automatic processing of such identification/look-up aspect(s).

Anti-Tamper Features

Systems and methods herein may also include anti-tamper enhancements of the above Signature authentication features, wherein further device tamper prevention of the general board circuitry content may be supported. Implementations, here, are directed towards common vulnerability exposed by typical scanning resources. These anti-tamper aspects are (a) complementary addition(s) to the above device authentication mission, extending protection to the entire board and system against attack via JTAG. Various embodiments provide overall product integrity defense against access to embedded board programmable memory devices as enabled by conventional JTAG methods. This access may include the ability to read and/or alter surreptitiously stored information, resulting in unintended product behavior, or revelation of proprietary information.

Such accessible storage devices might contain firmware (e.g. FLASH devices or similar), data parameters (e.g. EPROMs), or logic behavior definition codes (e.g. CPLDs or FPGAs). Features, here, also apply to runtime alterations of volatile memory, such as RAM. By enhancing the scanning logic, the above Signature mechanism is embellished with mechanized gateway controls protecting this information from scanning access. Thus, devices including these configurations may restrict certain scanning behavior to operate only after a successful unlock sequence similar to the Signature authentication approach, detailed as follows.

Illustrative implementations involving the JTAG scanning protocol(s), for example, may include the disablement of the EXTEST instruction state while the device is locked. Other implementations may include prohibiting the device from processing CPU debug commands, such as used for emulation activity. The latter allows external scan controller commands to engage embedded CPU processor diagnostic actions similar to instruction execution. Typically, these are the primary means of external visibility and alterability of stored board memory circuit content, using the JTAG facility. However, innovations, here, may include gateway mechanism(s) that allow program content access of connected devices only to authorized scanners, defending a major access path for viruses and Trojans or general firmware and behavior usurpation.

Systems and methods with such anti-tamper features may be implemented in conjunction with the TAS, similar to various authentication embodiments, and may also support special scans to engage an unlock sequence. This requires additional feature inclusion in protected devices of the scanning mechanism, being an enhancement of the Signature method. Besides unlocking access to elements of board resources, additional scanning conditions, possibly including common JTAG states (e.g. Test Logic Reset) may also be enhanced to re-enable the locked state, possibly upcoming repeated unlock actions. Implementations may thus be configured to enable such re-entry into the locked state, and regaining protection after an authorized unlocked access, during a normal JTAG sequence. Configurations wherein the TAS securely unlocks and later re-locks JTAG access to internal circuit resources via scanning constitutes a gateway system controlling board resource access by authorized testers alone.

To minimize obstruction of conventional circuit testing, some scanning states, such as the classical JTAG instructions BYPASS, IDCODE, USERCODE and INTEST, may remain operable regardless of the device locked state, allowing unhindered standard board infra-structure scans, for example. In this way, a partially locked state may not block conventional limited scanning methods, so long as restricted board accesses are prohibited.

The following illustration re-uses the basic signature authentication mechanism above, including the scanned-in interrogation code, the internal hidden seed code, and the hash encryption processor which produces a signature output. Some alterations may support this additional gateway feature herein, namely, the features to qualify the interrogation instruction distinguishing certain steps of the unlock cycle, even while re-using the same interrogation register. Another change involves the means for the signature register code being held internally but blocked from output scanning, to keep it hidden from external access. This approach re-uses the same hidden seed code above, unique per device instance and known only to TAS (or similarly-postured entity or authority), assuring unlock access restrictions.

Figure 8:
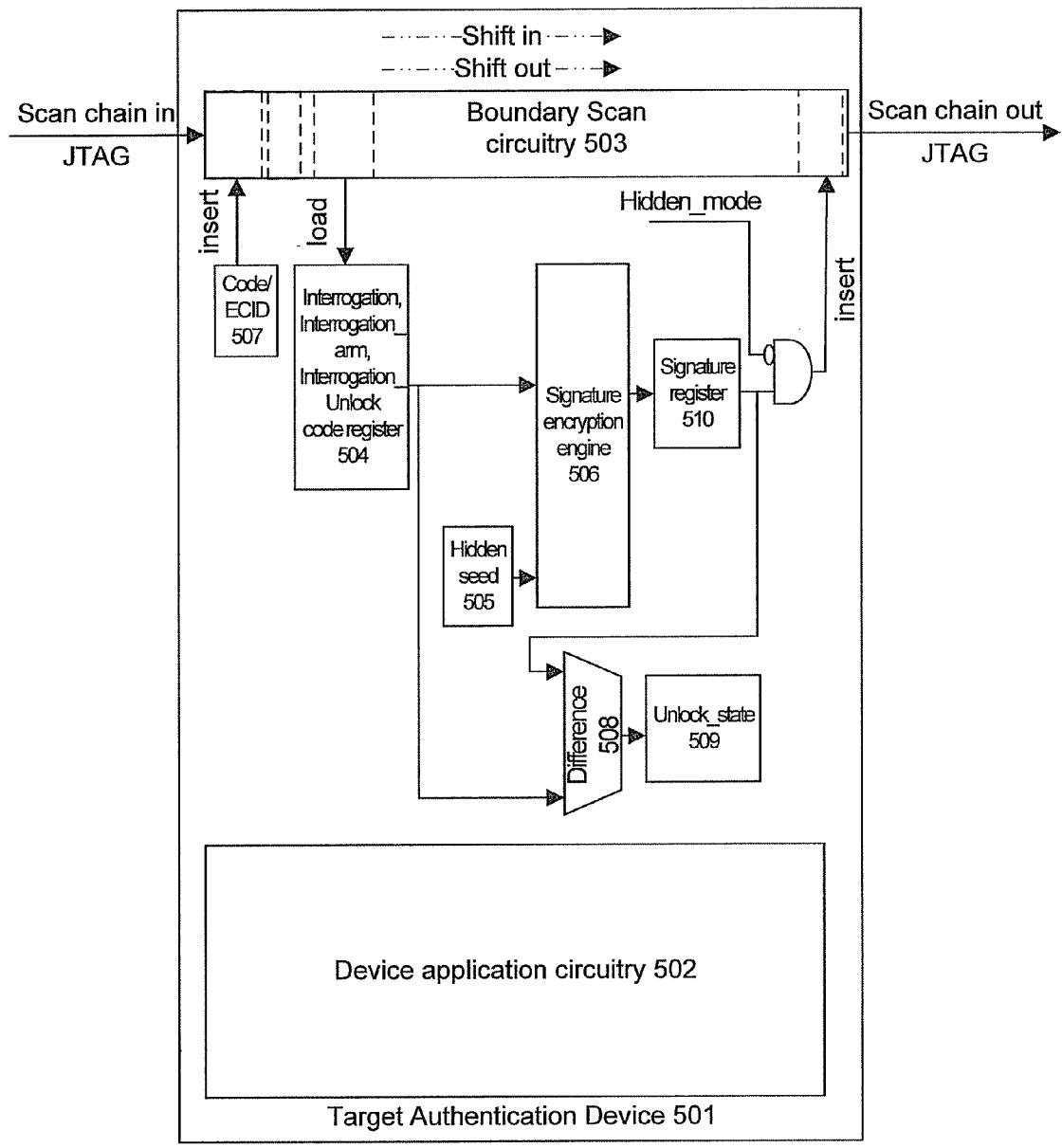
FIG. 8 is a diagram of another illustrative authentication system showing anti-tamper features according to disclosed implementations.

Referring to FIG. 8, various device scanning elements as improved to support such anti-tamper unlock capabilities are shown (see, e.g., elements 504, 508 and 509). With regard to differences from the above Signature structure (still supported here), the interrogation code register may now hold 3 variant meanings of information, depending on usage (e.g. by alternate Instruction Register contents). As a first variant, the prior interrogation code operates for authentication as before. Additional scan-in variants hold an INTERROGATION_ARM value, and an INTERROGATION_UNLOCK value, during sequential unlock update cycle scans. The selection of this register content and its meaning may be determined by JTAG instruction codes (e.g. INTERROGATION_ARM, INTERROGATION_UNLOCK) via the SCAN-IR state path, possibly sharing the same physical data register, but placing the scan system into differing states. Thus, while the storage resource may be reused (interrogation register), its meaning and usage alters the device behavior. Related usage information may be included in the commonly published device BSDL file.

In general, scanning in an INTERROGATION_ARM value loads a random number to be processed into a signature result by combining with the hidden seed value (as in the authentication process above). It simultaneously may cause the scan mechanism to enter the active hidden_mode, which blocks signature extraction (e.g. a meaningless value may shift out). Only TAS knowing the device hidden seed can properly determine such signature register content. The latter value is then provided by TAS and scanned into the interrogation register as an INTERROGATION_UNLOCK value. If it matches (or is related to) the signature code previously computed, the unlock_state may be updated, thereby altering JTAG scan-ability of the device and its system visibility. Thus, knowledge of the un-extractable signature may be used as a key to update the unlock_state. Upon updating the unlock_state, the signature register may be cleared and the hidden_mode may become inactive, automatically.

By downloading an INTERROGATION_UNLOCK value which is not an exact match to the signature, but of known relationship (e.g. differs by some constant offset), the updating of the unlock_state may transition to one of several optional levels. For example, meaningful levels might include LOCKED (the scan mechanism for the device fully blocks all system visibility scans), UNLOCKED (the scan mechanism offers no restrictions to system visibility scans), NO_EXTEST (the device prohibits scanning i/o pin values), NO_DEBUG (the device prohibits emulation type commands for the device), and many other permutations of scan visibility, according to the device construction. Such information may be catalogued in the device BSDL file.

The loading of the differing meanings of the interrogation register may alter the operation of the device, particularly of unlock_state and hidden_mode states, with commensurate behavioral changes. The hidden_mode control, when active, prevents the signature register from be extracted, keeping it un-viewable outside the device. It may become active upon scanning in of the INTERROGATION_ARM value, so that a following signature result cannot be publicly observed. A mechanism may be provided to revert the unlock_state back to maximal protection (e.g. LOCKED) such that after visibility has been enabled and exercised, the device will again enter a highly defensive status. One method may include a later JTAG state entry, such as Test-Logic-Reset (TLR) for example, making the device maximally tamper resistant again.

In some embodiments, the hidden seed code operates unchanged from the implementations described previously, as does the hash encryption mechanism. Further, the signature output register may be similar to above, except that it does not yield its content at a certain point in the sequence (hidden_mode), and may instead provide only a meaningless constant if extraction is attempted. Difference or mapping logic 508 may be included as a new hardware element, which transitions an unlock_state register 509. The unlock_state register 509 defines the unlocked status and accessibility restriction level of the scan system. The unlock_state register may be defaulted to the locked state upon power-up or certain scan state entries defined by the device design. In implementations involving JTAG scanning systems, such device designs may include the Test Logic Reset (TLR) state, such that a device unlock state can be re-initialized to a locked state between tests. In general, the meaning of the unlock_state and its levels may be device-type specific, allowing varying amounts of JTAG functional blocking to protect board resources.

The scanning steps to unlock a supported device may include one or more steps of the sequence below.

1. This approach presupposes that all devices of the board have been authenticated, TAS being made aware of the supported set of devices, and their associated hidden seed values (as looked up from IC fabricator supplied files).
2. The test scan instrument is linked to TAS and establishes its authority to gain some unlocked access level to the subject board. This includes having received user identification, authorization passwords, and identification of the subject board (referencing the specific device).
3. The TAS supplies a random code per device directing the local scan instrument to scan it into each interrogation register, identifying this as an INTERROGATION_ARM scan.
4. The scan system of all supported devices produce their signature output codes into their signature registers via their hash encryption engine based on the scanned in random INTERROGATION_ARM number and their hidden seed values.

5. Concurrently, the signature register enters a hidden mode, such that any attempt to extract its content yields unrelated information (possibly a useless constant). The signature register content is called the signature_unlock value which cannot be scanned out and will be flushed below.
6. The TAS may then calculate the signature_unlock (not extractable from the device, being hidden) based on it supplied random INTERROGATION_ARM and known hidden seed codes for each device.
7. The TAS may add an adjustment to the resultant signature_unlock computed value to select one of several unlock levels as defined for each device (e.g. an offset of N might mean fully unlocked, an offset of M might mean unlock EXTEST only, an offset of L might mean unlock debug instructions, and so on). The resultant number will be called the INTERROGATION_UNLOCK code for each device.
8. The TAS will then provide the local scan controller the INTERROGATION_UNLOCK codes for all devices and have it scan these into their interrogation registers.
9. The mapping (a difference in this example) between the INTERROGATION_UNLOCK register and the signature output register value is computed by the dedicated difference logic, whose value is loaded into the unlock_state register, establishing the scan board accessibility through the device in future scans. Since only the TAS knows the exact content of the undisclosed signature_unlock, it cannot be practically predicted by unauthorized scanners.
10. Upon updating of the unlock_state, the signature is updated again, by hash updating it with the INTERROGATION_UNLOCK and hidden seed codes. The signature register now leaves the hidden mode enabling normal extraction by scanning means.

Once unlocked, the test system is now free to perform scans of the devices in the chain at will, up to the level of system visibility allowed by each device's unlock level. Therefore, for totally locked devices, restrictions may prohibit operating device pins (e.g. EXTEST disabled, which blocks manipulation of connected pin memory devices). Similarly, certain unlock levels may prohibit exercise of CPU debug preventing commanded device bus accesses to memory devices. At some point during testing in certain implementations, the scanning system may bring the device from a scan unlocked state back to fully locked (such as by passing through the TLR JTAG state). This applies to the conclusion of visibility scanning by an authorized tester, now putting the device back into a defensive state pending future scans.

Underlying Features of Various Implementations

Serial Number Acquisition: In some embodiments, the board serial number may be electronically readable from a dedicated serial number IC on the board (possibly included in the JTAG scanning), which imposes a burden on the board design and cost. Implementations may also utilize printed barcodes or other machine readable markings. Other automatic methods may employ numerical auto-incremented assignments by board assembly robotic controllers. Additionally, although less automated, manual keyboard or similar entry from visible markings may be performed.

Delivered Device Lot Number Acquisition: In some embodiments, the device encrypted lot numbers may be readable as a printed barcode or other machine readable marking. Other implementations may employ electronically readable media included in a package, such as a flash drive, CDROM, or similar storage recording. Additionally, although less automated, further implementations may include manual keyboard or similar entry from visible markings. Such packages would not normally contain the actual ECID list of contained devices, which are typically maintained in a secure fashion. For example, they may be stored and accessed at a secure location, such as the TAS server, after lookup via decrypted lot number. Such lists may be previously documented and securely uplinked by the IC fabricator, minimizing public exposure.

According to further embodiments, the lot number accompanying each shipped package of devices may be encrypted and/or otherwise not directly linkable to the actual ECID numbers within. Here, for example, the conversion to the plain text lot number may require application of a decryption key, such as one that is only distributed to registered and authorized board manufacturers.

These features provide additional defense confounding supply chain interception of authorized lots, preventing acts of deception in the supply chain such as substituting original devices with counterfeit devices having the correct ECID population. With the security features herein, only permitted board manufacturers are readily able to determine the plain text lot number and thus gain access to the related ECID numbers list. However, this remains a vulnerability for counterfeit operators exercising extraordinary effort to read the number from intercepted bare (unmounted) devices and who posses the ability to install such into substitution devices. This special case is overcome by the enhanced Signature method.

Alternate ECID/Position Extraction

Non-JTAG Scanning Protocols: Certain devices may contain ECID numbers wherein access to these numbers does not comply with JTAG protocol or methods. In such cases, special adaptations of scan controller instrument may be utilized to provide such extraction in support of the authentication methods herein.

For example, some implementations may utilize firmware-based ECID extractions. Some variants of this ECID access may include implementations where embedded CPU firmware reads are supported, but without support of direct nor debug port emulation scan methods. One such approach utilizes test firmware, which may be built-in, downloaded or infused, that is configured to support ECID access and conveyance of such to the external instrumentation via CPU application ports.

Alternate Instrument Management/Linkage

In cases with instruments that expose network compatible interfaces, such as Ethernet, the local client PC may be eliminated, using direct instrument linkage to the network connection. In such cases, the instrument may be managed by and communicate with one or more remote processing components, such as a server. Such instruments may also be configured with features enabling collection and conveyance of secondary information required for the authentication process, e.g., device lot numbers, board serial numbers, etc. These instruments may also be configured with functionality to store lot key codes (e.g., downloaded from the server) and perform the decryption processing.

Non-TAS Based Systems and Methods

Alternative embodiments herein include systems wherein need for or use of TAS-based approaches are circumvented. Several examples of such systems are shown in FIGS. 6A-6B and 7A-7B, as described in more detail below. In such cases, device lot information may be obtained directly from IC fabricators, using conveyance security methods. Further, here, the ECID lists for installed devices may be maintained in the board manufacturing location 108, where the authentication of devices would be performed (see, e.g., FIGS. 6B and 7B). Conversely, this ECID list confirmation may also be performed by the IC fabricator 102 (see, e.g., FIGS. 6A and 7A), upon receipt of decrypted lot numbers from the board manufacturers.

In either case, the creation, maintenance and referencing of board ECIDs/positions for re-authentication may be located elsewhere, such as at the IC fabricator location, the board manufacturer location, or this functionality may be converted to a local function operated at each test site using file information which can be transported as required (such as in flash drives, CDROMs, etc.). In the latter case, the re-authentication may be accomplished by the local test instrument at the target location.

Figure 6A:
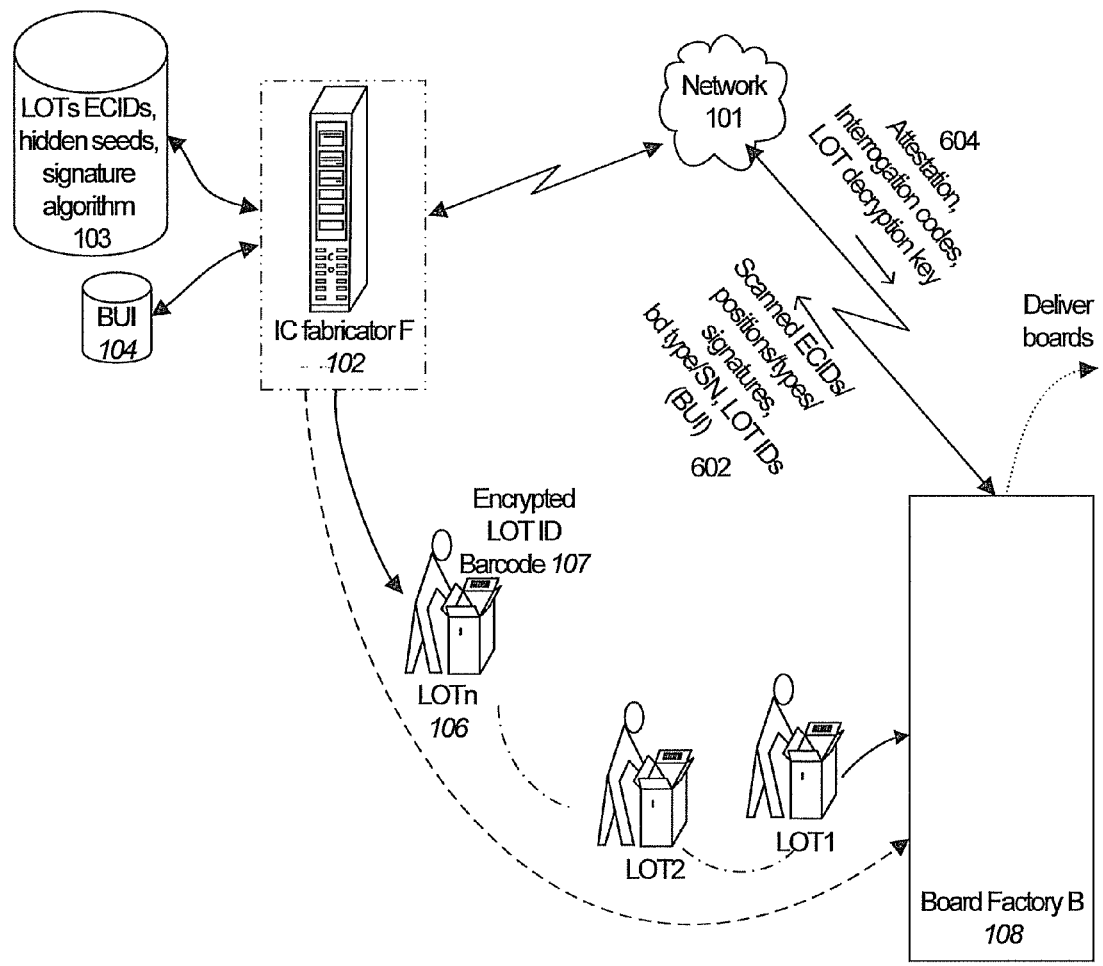
FIGS. 6A-6B are diagrams of additional illustrative initial authentication processes and associated information processing, without a trusted site, according to disclosed implementations.
Figure 6B:
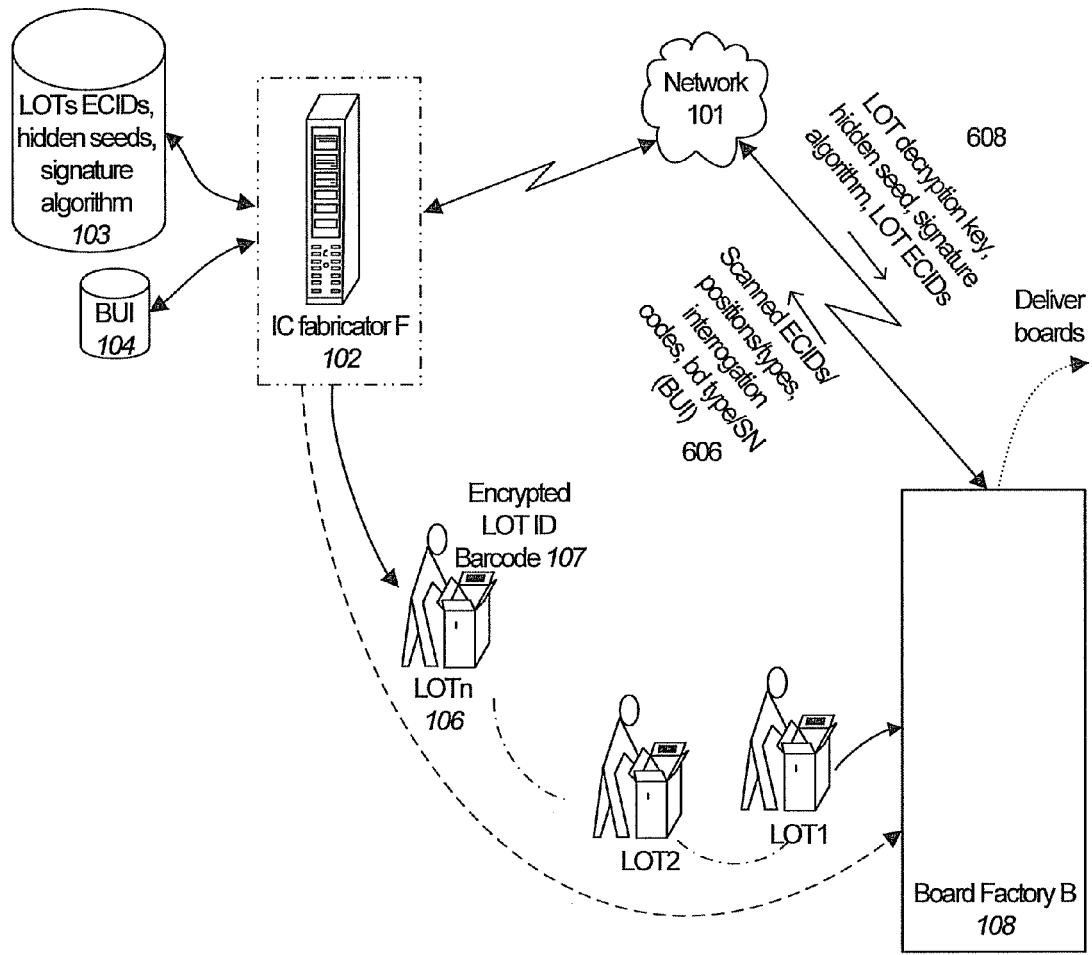

FIGS. 6A-6B are diagrams of illustrative initial authentication processes and associated information processing without a trusted authentication site (TAS), according to disclosed implementations. As illustrated in these systems, both circuitry and algorithm information 103 and board unique information (BUI) 104 are shown associated with the IC fabricator entity 102. However, this information may readily be located elsewhere or otherwise accessed, and innovations herein include implementations with various distributions and processing of this, and other such, information in permutations beyond those shown for purpose of illustration, here.

Referring to FIG. 6A, an illustrative initial authentication process is shown, wherein authentication itself is carried out at the IC fabricator 102. Here, for example, the various scan information 602, such as scanned ECIDs/positions/types/signatures, interrogation codes, board types/serial numbers, lot IDs, and/or board unique information, are transmitted from the board factory 108 to the IC fabricator 102 for authentication. In authentication processing, then, various associated reply information 604, such as the attestation data, interrogation codes and/or LOT decryption keys, are transmitted from the IC fabricator 102 to the board factory 108, to provide authentication.

Referring to FIG. 6B, another variety of authentication processing is shown, wherein authentication occurs at the board factory 108. Here, for example, initial information 606, such as scanned ECIDs/positions/types, interrogation codes, board types/serial numbers, and/or board unique information (BUT), is transmitted to the IC fabricator to give them sufficient information to transfer the data that's necessary for decryption and authentication to occur back at the board factory 108. In such subsequent transfer step 608, the IC fabricator 102 transmits information, such as LOT decryption key, hidden seed and/or signature algorithms, LOT ECIDs, etc., to the board factory 108 to enable completion of the authentication process.

Figure 7A:
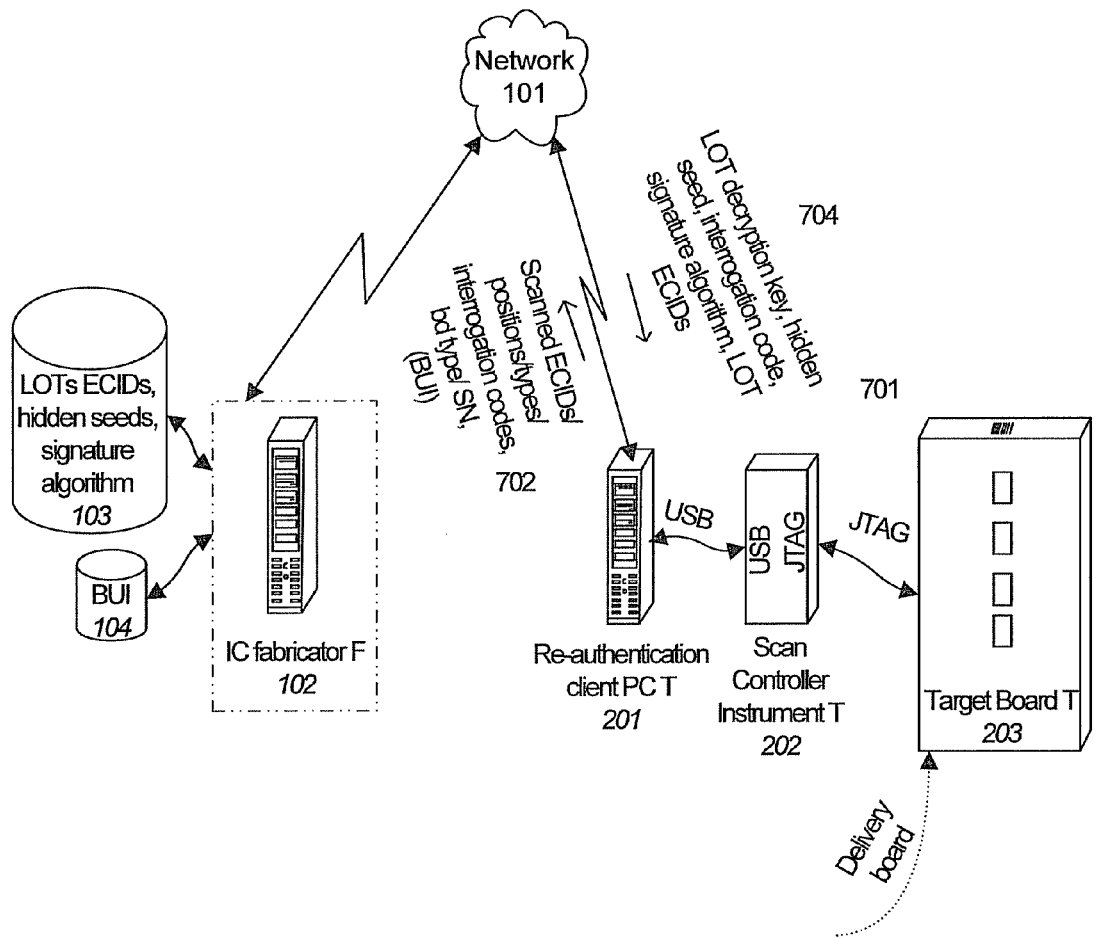
FIGS. 7A-7B are diagrams of additional illustrative re-authentication processes and associated information processing, without a trusted site, according to disclosed implementations.
Figure 7B:
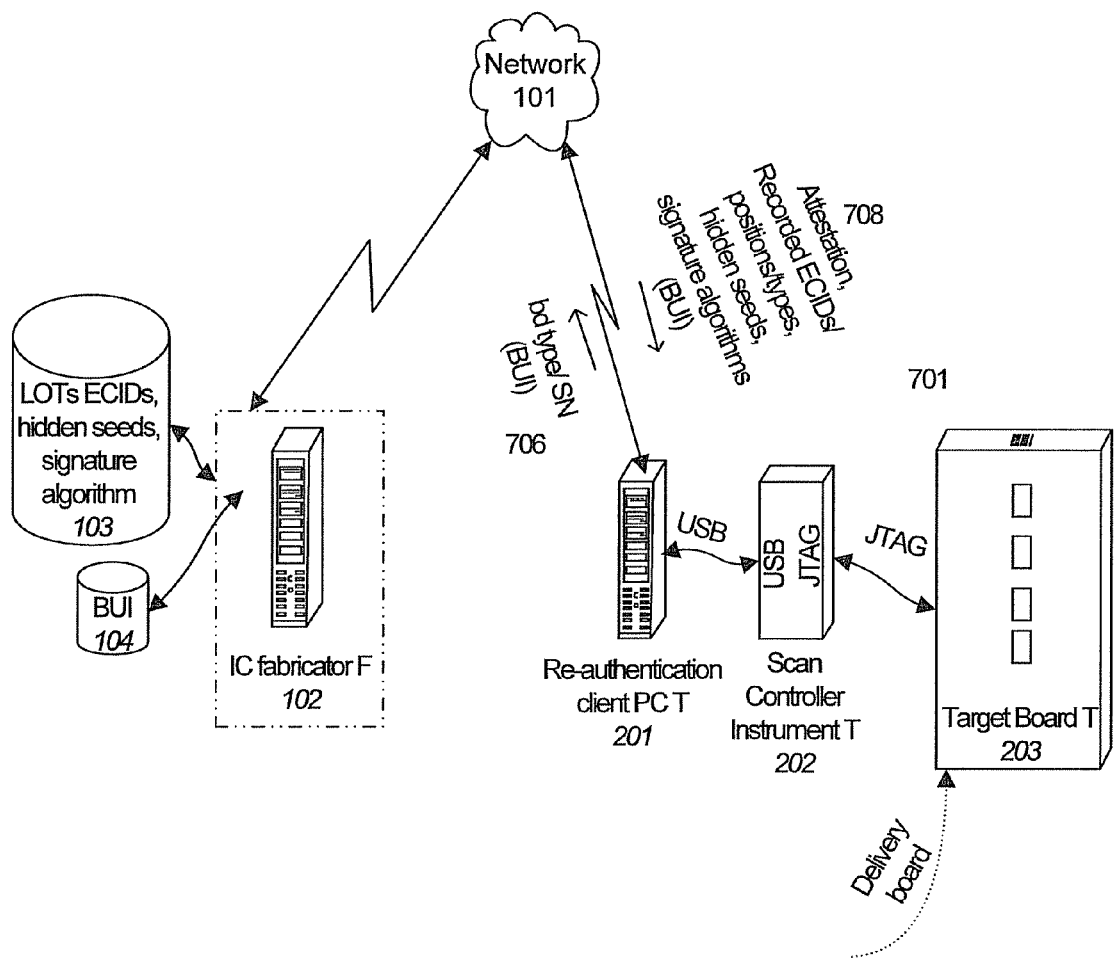

FIGS. 7A-7B are diagrams of illustrative re-authentication processes and associated information processing without a centralized site (TAS), according to disclosed implementations. Referring to FIG. 7A, an illustrative re-authentication process is shown, wherein authentication itself is carried out at the IC fabricator 102. Here, for example, the various scan information 702, such as scanned ECIDs/positions/types, interrogation codes, board types/serial numbers, and/or board unique information (BUI), may be transmitted from the remote test site 701 for authentication. In authentication processing, then, various associated reply information 704, such as the LOT decryption keys, hidden seed and/or interrogation codes, signature algorithms and/or LOT ECIDs, are transmitted from the IC fabricator 102 to the remote site 701, to provide authentication.

Referring to FIG. 7B, another variety of re-authentication processing is shown, wherein authentication occurs at the remote site 701. Here, for example, initial information 706, such as board types/serial numbers and/or board unique information (BUI), is transmitted to the IC fabricator 102 to provide sufficient information to transfer the data necessary for decryption and authentication to occur back at the remote site 701. In such subsequent step of transferring data back 708, the IC fabricator 102 transmits information, such as attestation data, recorded ECIDs/positions/types, hidden seed and/or signature algorithms, and/or board unique information (BUI), to the remote site 701 to enable completion of the re-authentication process.

Alternate Data-Flow/Processing Locations

In still alternate embodiments, the lot number decryption process may be moved to the TAS (or IC fabricator in systems without a TAS component). In such cases, a board manufacturer may securely upload the encrypted lot numbers involved in a board assembly, along with its lot key (proving its authority to access this information).

Various general functions of these embodiments may also be relocated in a variety of differing arrangements relative to the basic implementations set forth above. In some implementations the ECIDs/positions extraction function may be built-in or co-located within the target board(s) being authenticated. Similarly, such functionality may be built-in or co-located within an associated computing component, such as the client PC. Further, here, client PC functions of instrument management and network communications may be split among several distinct processor units, with information passing between them electronically or by manual transfer (such as via portable storage media). This may be suitable for sites where network linkage is separated from engineering operations for security sake.

Additional tasks of information handling, recording, reading, analyzing, logging, encryption, decryption and reporting may be relocated in various combinations to the instrument, the client PC, the IC fabricator, or the TAS remote server.

Associated with the above functions may be supporting software tools which execute in various combinations on the remote server, local computing components such as a local PC client, the IC fabricator or within an embedded processor in the instrument. Such software may be configured to perform various other functions, such as managing the scanning operations, communicating over the network(s), encrypting and/or decrypting the various groups of information and/or files, managing various libraries to store and withdraw information, processing information retrieved from such libraries or received over communications links in support of the authentication tasks, receiving/processing various options/settings as input by live users linked into the system, enabling various GUI functionality such as depicting various screens or indicators showing menus and outcomes for visualization on various terminals linked to the system, and operating various timing schedules to pace various automatic actions.

In the following, target board refers to the circuit board, assembly or system whose enabled ECID devices are to be authenticated. The types of information passing into or out of the processing functions may include one or more of:
1. target type (common board part number).
2. target serial number (distinct for each instance of board).
3. device ECID codes for each participating device on the target, as extracted from it.
4. part types (as a family of common part number) for the above devices per the board BOM listing (as commonly known by JTAG tools).
5. device position (U number) as mounted on the target, per board chain topology information (as commonly known by JTAG tools).
6. device lot number for a minimally deliverable group of a given device type installed on the target in support of this method. Shipments of such devices may be comprised solely of inseparable units of such lot size, encapsulated, packaged, identified by encrypted lot number and securely documented.
7. a list of ECID codes created by the IC fabricator referenced by its unencrypted lot number. Such list is not to be included or disclosed on or within the shipped lot package.
8. a lot key enabling the conversion of encrypted lot numbers into plain text lot numbers. Such key must be made available only to authorized board manufacturers to decrypt device lot numbers associated with the reservoirs used to populate each particular board.
9. various user command/menu inputs and visibility display outputs and/or indicators.
10. interrogation codes, typically random values, to scan into Signature method supporting devices, which may vary for each device on a board and each instance of testing.
11. signature codes computed within Signature method supporting devices scanned out for comparison to re-constituted versions based on knowledge of scanned in interrogation codes and internal hidden seed values, unique per device instance.

The various groups of information above may exist and/or be transferred/stored in plain text or encrypted formats as appropriate to maximize security. The related software tools which handle this information may be configured for decryption/encryption in either direction as needed, taking appropriate precautions to maintain high security, and minimizing public conveyance and disclosure of plain text information.

The practice of instance-to-instance variance of encrypted information may contribute greatly to confound unauthorized listeners of the information conveyed and/or stored by the methods of this invention. This may be included herein by usage of ever changing NONCE codes (known each instance by the encrypting and decrypting system) which are tacked on to plain text information prior to encryption. It is typically comprised of a current time-stamp or random number, to be appended to the pre-encryption plain text, resulting in varying encrypted patterns, even for unchanging data.

Information employed or processed in connection with the innovations herein may originate either by network conveyance, reading of electronic media (such as a flash stick accompanying the delivered IC's), reading printed barcodes or machine readable patterns, inputs by manufacturing equipment or operators using keyboard or similar method, or electronic storage.

Recorded Board ECID and Signature Database (BUI) Features

Systems and methods herein may be configured to process files that memorialize the unique set of ECID numbers and/or hidden seed codes for each device type and their placement for each manufactured circuit board instance (having a given serial number) among a given type. In some embodiments, this information may be exclusively maintained at the TAS for maximal security and minimal public exposure and dissemination. Such information may contain a growing list of circuit boards and their serial numbers, recording their associated set of ECID codes, hidden seed codes and positions (U numbers) as placed therein. This information is referred to herein as the board unique information (BUI), related to a given type of board (part or model number).

The information stored in such BUI may include a record for each instance of such board and each ECID compliant device placed thereon, including;

1. U number (defining its position in the circuit).
2. Device type (common device part number) as available from the board BOM.
3. Authenticated unique ECID, as validated upon board stuffing and initial ECID extraction against secure IC fabricator shipped lot information. Such value may preferably be maximally random relative to other devices packaged within a lot.
4. hidden seed code within each device supporting a re-generation of a new signature based on a scanned in random interrogation code. Such value may preferably be maximally random relative to its ECID code and other devices packaged within a lot.

ECID Code Format Aspects

As set forth above, aspects of the present systems and methods may depend upon the uniqueness of the ECID per device as installed in each target circuit board. Any actual meaning inferred by such codes does not add or subtract from the authentication effectiveness. However, additional benefits can be gained by encoding into these numbers information fields which have utility to the IC fabricator in quality control. Examples might include one or more of:

1. IC wafer number . . . identifies a particular fab source wafer from which the IC die was cut.
2. wafer x, y die coordinates within the above wafer.
3. unique die serial number as assigned by the IC fabricator.
4. IC fabricator foundry plant identifier (distinguishing one among several).
5. time-stamps or similar fabrication event characteristics.
6. a randomizer segment to insure statistical distinction between devices within the same lot.

A main usage of integrating such features would benefit the IC fab vendor, especially when the extraction of ECID values is employed during board testing. Given the rich testing capabilities of JTAG, beyond the authentication methods discussed herein, IC faults can be readily detected and localized to a particular device. Therefore, mapping each IC fault to its die creation information (encoded in the ECID) can expedite tracing to the fab process. This can further contribute to fault statistical compilations and correlations over the complete set of such IC's. Of course, an arbitrary ECID number which is mapped to the above information in fabricator records would still enable as a means of tracking the same information.

Given that a number of ECID encoding and read-out format and methods may be supported, including a potential industry standards, the subject authentication tools may readily accommodate such variations by smart algorithm agility, serving the widest device and board population.

In the present description, the terms component, module, sequence, and functional unit, may refer to any type of logical or functional process or blocks that may be implemented in a variety of ways. For example, the functions of various blocks can be combined with one another into any other number of modules. Each module can be implemented as a software program stored on a tangible memory (e.g., random access memory, read only memory, CD-ROM memory, hard disk drive) to be read by a central processing unit to implement the functions of the innovations herein. Or, the modules can comprise programming instructions transmitted to a general purpose computer or to graphics processing hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, embodiments and features of the invention may be implemented through computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe components such as software, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard mobile-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Other embodiments of the invention will be apparent to those skilled in the art from consideration of the specification and practice of the invention disclosed herein. It is intended that the specification and examples be considered as exemplary only, with a true scope and spirit of the invention being indicated by the disclosure above in combination with the following paragraphs describing the scope of one or more embodiments of the following invention.

The systems and methods disclosed herein may be implemented as a computer program product, i.e., a computer program tangibly embodied in an information carrier, e.g., in a machine readable storage medium or element or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

It is to be understood that the foregoing description is intended to illustrate and not to limit the scope of the invention, which is defined by the scope of the appended claims. Other embodiments are within the scope of the following claims.

The invention claimed is:

1. A device comprising:
application circuitry;
one or more scan or boundary scan components adapted to shift in and shift out test scans of the application circuitry;
a unique code adapted to uniquely identify the device;
an interrogation code component adapted to interact with interrogation information having an interrogation code applied to the device;
a hidden seed element which is of unique value per device of a given type, used in a signature generation process for the device, wherein the hidden seed is involved with though not directly accessible during authentication of the device, not extractable from the device, and initially known only to an IC fabricator that fabricated the device;
a signature encryption component that provides an output signature code that is unique to the device, for given interrogation information, the output signature code being a function of the hidden seed;
wherein the device and/or signature encryption engine are configured to process a test/scan procedure performed on the device, the test/scan procedure comprising:

shifting in and shifting out, via one or more scan or boundary scan components, test scans of the application circuitry, each test scan comprising the interrogation information;

performing a signature generation process within the device, via the signature encryption component, using the hidden seed element which is of unique value per device of a given type, the signature being a function of algorithmic interaction with at least the hidden seed and the interrogation code, and consisting of a signature code based only on the algorithmic interaction such that the hidden seed is not discernable from the signature code, wherein the hidden seed element is not extractable from the device, and is initially known only to the IC fabricator that fabricated the device; and providing the signature code that is unique to the device, for given interrogation information as output, wherein authenticity of the signature code can only be determined by knowledge of the device's hidden seed and the interrogation code;

wherein, as a function of (i) the hidden seed being inaccessible from the device and unlearnable during authentication via the interrogation codes of the test/scan procedure and (ii) ability to perform the test scans without knowing the hidden seed, the device is counterfeit-resistant.

2. The device of claim 1 wherein arbitrary interrogation codes may be used in the signature generation process as a function of the hidden seed.

3. A method of providing defense against supply chain interception of a device, the method comprising:

the device and/or a signature encryption engine of the device processing a test/scan procedure performed on the device, the device having a signature encryption component as well as a hidden seed element that is involved with though not directly accessible during authentication of the device, the test/scan procedure including:

shifting in and shifting out, via one or more scan or boundary scan components, test scans of application circuitry, each test scan comprising interrogation information having an interrogation code;

performing a signature generation process within the device, via the signature encryption component, using the hidden seed element which is of unique value per device of a given type, the signature being a function of algorithmic interaction with at least the hidden seed and the interrogation code, and consisting of a signature code based only on the algorithmic interaction such that the hidden seed is not discernable from the signature code, wherein the hidden seed element is not extractable from the device, and is initially known only to the IC fabricator that fabricated the device; and providing the signature code that is unique to the device, for given interrogation information as output, wherein authenticity of the signature code can only be determined by knowledge of the device's hidden seed and the interrogation code;

wherein, as a function of (i) the hidden seed being inaccessible from the device and un-learnable during authentication via the interrogation codes of the test/scan procedure and (ii) ability to perform the test scans without knowing the hidden seed, the device is counterfeit-resistant.

* * * * *